United States Patent
Bech et al.

(10) Patent No.: US 9,689,266 B2
(45) Date of Patent: Jun. 27, 2017

(54) PRODUCTION FACILITY COMPRISING A TRANSPORT SYSTEM FOR PROCESSING ELONGATED PRODUCTS, IN PARTICULAR WIND TURBINE BLADES, WITH ELONGATED MOULD ASSEMBLIES

(75) Inventors: Anton Bech, Rinkøbing (DK); Raul Garcia Tapia, Portsmouth (GB); Aksel Petersen, Rinkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 427 days.

(21) Appl. No.: 14/235,390

(22) PCT Filed: Jul. 19, 2012

(86) PCT No.: PCT/DK2012/050272
§ 371 (c)(1),
(2), (4) Date: Apr. 7, 2014

(87) PCT Pub. No.: WO2013/013676
PCT Pub. Date: Jan. 31, 2013

(65) Prior Publication Data
US 2014/0215783 A1    Aug. 7, 2014

Related U.S. Application Data

(60) Provisional application No. 61/521,369, filed on Aug. 8, 2011, provisional application No. 61/521,367, filed
(Continued)

(30) Foreign Application Priority Data

Jul. 28, 2011 (DK) .................. 2011 70417
Jul. 28, 2011 (DK) .................. 2011 70418
Jul. 28, 2011 (DK) .................. 2011 70419

(51) Int. Cl.
  *F01D 5/14* (2006.01)
  *B29C 33/26* (2006.01)
  (Continued)

(52) U.S. Cl.
  CPC .............. *F01D 5/147* (2013.01); *B29C 31/04* (2013.01); *B29C 33/26* (2013.01); *B29C 70/38* (2013.01);
  (Continued)

(58) Field of Classification Search
  CPC ......... B29C 33/26; B29C 33/28; B29C 43/36; B29C 70/38; B29C 70/46; B29C 70/462;
  (Continued)

(56) References Cited

U.S. PATENT DOCUMENTS 3,302,801 A * 2/1967 Poroli .................... B66C 19/02
                                                                    212/176
3,335,875 A * 8/1967 Fachinetti ............... B66C 19/02
                                                                    212/314
(Continued)

FOREIGN PATENT DOCUMENTS

CA       2762777 A1   11/2010
GB          597    *   0/1914
(Continued)

OTHER PUBLICATIONS

European Patent Office, Official Action issued in Application No. 12 746 010.3 dated May 20, 2015.
(Continued)

*Primary Examiner* — Sarang Afzali
(74) *Attorney, Agent, or Firm* — Wood Herron & Evans LLP

(57) ABSTRACT

A production facility for forming elongated products, in particular wind turbine blades, includes elongated mould assemblies that may be accessed on the basis of an appro-
(Continued)

priate transport system which includes at least one support member laterally positioned between the elongated mould assemblies. The support member is positioned so as to enable a rotational movement of an arm or is configured to change position or includes a rotatable carrier element. The support member may be positioned in a non-interference position, in which one or both mould assemblies can be moved into a position so as to form a composite mould assembly.

47 Claims, 18 Drawing Sheets

Related U.S. Application Data on Aug. 8, 2011, provisional application No. 61/521,371, filed on Aug. 8, 2011.

(51) Int. Cl.
    *F03D 1/06*     (2006.01)
    *B29C 70/38*     (2006.01)
    *B29C 31/04*     (2006.01)
    *B29L 31/08*     (2006.01)

(52) U.S. Cl.
CPC ...... *F03D 1/0675* (2013.01); *B29L 2031/085* (2013.01); *F05B 2230/21* (2013.01); *Y02E 10/721* (2013.01); *Y02P 70/523* (2015.11); *Y10T 29/37* (2015.01); *Y10T 29/49336* (2015.01)

(58) Field of Classification Search
CPC .... B29C 2043/3676; B29C 2043/3681; B29C 2043/3689; B29C 66/8324; B29C 66/83241; B29C 66/834; B29C 66/87; B29D 99/0025; B29D 99/0028; Y10T 156/17; Y10T 156/1744; Y10T 29/49336; Y10T 29/37; Y10T 29/53539; Y10T 29/53543; Y02P 70/523; B29L 2031/085; B66F 11/04
USPC ...................... 198/632, 313, 861.4
See application file for complete search history.

(56) References Cited

U.S. PATENT DOCUMENTS

| | | | | |
|---|---|---|---|---|
| 4,098,624 A * | 7/1978 | Laird, Jr. | ............ | C21D 9/0018 148/631 |
| 4,139,180 A * | 2/1979 | Itani | ............ | B63B 9/00 114/222 |
| 4,334,480 A * | 6/1982 | Wallace | ............ | B66C 19/02 104/126 |
| 4,381,839 A * | 5/1983 | Engler | ............ | B66C 19/02 212/314 |
| 4,619,427 A * | 10/1986 | Leymann | ............ | F16M 11/04 108/102 |
| 4,836,111 A * | 6/1989 | Kaufmann | ............ | B23Q 1/26 104/247 |
| 4,966,323 A * | 10/1990 | Speller, Sr. | ............ | B21J 15/14 227/111 |
| 5,248,341 A * | 9/1993 | Berry, Jr. | ............ | B05B 13/0431 105/163.2 |
| 5,351,809 A * | 10/1994 | Gilmore | ............ | B65G 21/14 198/594 |
| 5,359,542 A * | 10/1994 | Pahmeier | ............ | B25J 9/1615 356/621 |
| 5,360,123 A * | 11/1994 | Johnston | ............ | B66C 5/02 104/126 |
| 5,896,637 A * | 4/1999 | Sarh | ............ | B23P 19/04 227/51 |
| 6,591,488 B1 * | 7/2003 | Tachibana | ............ | B23P 19/001 29/771 |
| 7,004,286 B2 * | 2/2006 | Fredette | ............ | B66F 11/04 182/62.5 |
| 7,730,622 B2 * | 6/2010 | McCauley | ............ | E04F 21/18 33/194 |
| 7,744,337 B2 * | 6/2010 | Kaufmann | ............ | B65G 59/02 198/592 |
| 8,151,968 B2 * | 4/2012 | Bremhorst | ............ | B65G 15/26 198/313 |
| 8,573,387 B2 * | 11/2013 | Trimble | ............ | B65G 41/002 198/313 |
| 9,199,301 B2 * | 12/2015 | Rajasingam | ............ | B29C 33/12 |
| 9,199,826 B2 * | 12/2015 | Shibata | ............ | H01L 21/67727 |
| 2003/0161708 A1 * | 8/2003 | Johnston | ............ | B66C 19/02 414/460 |
| 2008/0028693 A1 * | 2/2008 | McCauley | ............ | E04B 9/00 52/126.1 |
| 2008/0251011 A1 * | 10/2008 | Albrecht | ............ | B05B 13/0431 118/500 |
| 2008/0277834 A1 * | 11/2008 | Schibsbye | ............ | B29C 33/26 264/334 |
| 2013/0195588 A1 * | 8/2013 | Shibata | ............ | H01L 21/67727 414/222.13 |
| 2013/0239379 A1 * | 9/2013 | Rajasingam | ............ | B29C 33/12 29/23.51 |

FOREIGN PATENT DOCUMENTS

| | | | | |
|---|---|---|---|---|
| GB | WO 2012019610 A1 * | 2/2012 | ............ | B29C 33/12 |
| WO | 2004/043679 A1 | 5/2004 | | |
| WO | 2010/129492 A2 | 11/2010 | | |
| WO | 2011/035539 A1 | 3/2011 | | |

OTHER PUBLICATIONS

Danish Patent Office, DK Combined Search and Examination Report issued in corresponding DK Application No. PA 2011 70417 dated Mar. 9, 2012, 7 pages.
Danish Patent Office, DK Combined Search and Examination Report issued in corresponding DK Application No. PA 2011 70418 dated Mar. 9, 2012, 7 pages.
Danish Patent Office, DK Combined Search and Examination Report issued in corresponding DK Application No. PA 2011 70419 dated Mar. 9, 2012, 8 pages.
International Searching Authority, Search Report and Written Opinion issued in corresponding PCT Application No. PCT/DK2012/050272 dated Oct. 12, 2012, 17 pages.

* cited by examiner

PRODUCTION FACILITY COMPRISING A TRANSPORT SYSTEM FOR PROCESSING ELONGATED PRODUCTS, IN PARTICULAR WIND TURBINE BLADES, WITH ELONGATED MOULD ASSEMBLIES

TECHNICAL FIELD AND BACKGROUND

Generally, the present invention relates to a production facility with a transport system, wherein elongated products, in particular wind turbine blades, are formed by using moulds that extend along the length of the elongated product and by combining the moulds to form the complete elongated product.

Elongated products, such as wind turbine blades, are frequently formed on the basis of fibre reinforced polymer materials, wherein a technique is frequently used, in which a first half of the elongated product is formed by applying layer after layer in one of the moulds and at the same time preparing the second half of the elongated product layer after layer in the second mould and finally combining the two moulds so as to join the two halves of the elongated product. Typically, the two halves have to be prepared on the basis of a specific process strategy with high precision, in particular when considering wind turbine blades, so that there is generally a continuous attempt in this field of industry to increasingly apply automated process techniques, which, for instance, require the usage of some sort of robot system, and the like. Due to the significant length of, for instance wind turbine blades, a corresponding robot system has to appropriately be positioned along the length of the elongated moulds, thereby typically requiring an adequate transport system. A corresponding transport system has to be configured in such a way that a movable part, which may carry a robot device and the like, can be positioned at any location along the length of the elongated mould, however, without unduly restricting accessibility of the mould by operators and workers. Preferably, the two moulds may be accessed individually and independently by a robot device, which in turn may require an appropriate support assembly in the form of rails, and the like, which, on the one hand, allows access of the moulds during the preparation of the various layer systems, while on the other hand, the moulds may be brought into contact with each other so as to form the composite mould assembly and thus enable the joining of the two halves of the elongated product.

Frequently, the two mould assemblies are brought into contact with each other by providing an appropriate mould drive mechanism connected to a movable mould assembly, which is rotated around at least one axis of rotation in order to position the movable mould assembly above the non-movable mould assembly, thereby "closing" the composite mould assembly. In particular, when a high degree of flexibility in operating a robot system on the basis of a transport system is required, as discussed above, typically the transport system comprises at least one centre rail positioned laterally between the movable and non-movable mould assemblies, wherein, however, the central position of this rail may significantly interfere with the rotational movement of the movable mould assembly.

In this respect WO2011/035539 describes an automated production system for wind turbine blades, in which two gantries can be independently operated so as to allow each gantry to be positioned along the corresponding mould on the basis of a centre rail that is positioned at a height level selected so as to provide for superior accessibility by workers. On the other hand, the centre rail comprises gaps that are positioned such along the entire length of the centre rail that the various hinge mechanisms for rotating one of the moulds can move through the corresponding gaps when closing the mould. In the open position of the mould assemblies the gaps may be "bridged" upon moving the gantry by providing a specific wheel system that allows the crossing of the gaps without losing contact to the centre rail. In other embodiments the gaps can temporarily be closed by laterally moving corresponding bridge sections from a first position, allowing the crossing of the hinge mechanisms, into a second position, in which the gap in the centre rail is closed.

Although the production system described in this document may provide for certain advantages with respect to allowing access of the moulds by workers and robot systems, there is still room for improvement so as to increase one or more of productivity, flexibility, efficiency and controllability of the production process.

It is thus an object of the present invention to provide a production facility including a transport system in order to enable the fabrication of elongated products, in particular of wind turbine blades, while taking into account one or more of the above identified aspects with respect to an improvement over the previously described prior art.

SUMMARY OF THE INVENTION

According to a first version of the present invention the object is solved by a production facility. The production facility comprises a first elongated mould assembly and a second elongated mould assembly extending in parallel to the first elongated mould assembly. Moreover, the production facility comprises a transport system that comprises an elongated support member extending along and laterally between the first and second elongated mould assemblies. The transport system further comprises a movable part configured to be positioned at least along the first and second elongated mould assemblies by using the elongated support member. Additionally, the transport system comprises a drive mechanism coupled to the elongated support member and configured to change a position of the elongated support member with respect to the first and second elongated mould assemblies.

The inventive production facility thus comprises a transport system whose configuration is selected such that the elongated support member is appropriately positioned so as to enable an appropriate positioning of the movable part along the entire length of the mould assemblies, while at the same time enabling movement of the elongated support member. Hence, the position of the elongated support member with respect to the first and second mould assemblies may be changed, for instance in correlation to a corresponding phase of the overall fabrication process, for example selecting different height levels as may be considered advantageous for the specific stage of the production process, thereby for instance, providing superior accessibility of the mould assemblies by workers, robot devices, and the like.

In one advantageous embodiment the production facility further comprises a mould drive mechanism coupled at least to the second elongated mould assembly and configured to position the second elongated mould assembly relatively to the first mould assembly so as to form a composite mould assembly.

Since at least the second mould assembly can be positioned with respect to the first mould assembly so as to form a composite mould assembly, even highly complex fabrication processes can be implemented in the production facility, such as the fabrication of wind turbine blades, typically requiring accessibility of the first and second mould assemblies over the entire length by the movable part of the transport system. Furthermore, in combination with the capability of changing position of the support member generally an increased degree of flexibility in implementing automated manufacturing sequences is achieved.

In one preferred embodiment of the production facility the drive mechanism is configured to perform a change of position of the elongated support member so as to position the elongated support member at a non-interference position that avoids interference with the positioning of the second elongated mould assembly relatively to the first mould assembly when forming the composite mould assembly.

Hence, the drive mechanism not only provides for superior flexibility in appropriately positioning the support member, but also enables the support member to be positioned at the non-interference position so that generally a superior degree of freedom is achieved in appropriately configuring the mould drive mechanism, for instance with respect to the drive components, hinge mechanisms, and the like, since the support member as a whole is moved to a non-critical position.

In one illustrative embodiment the mould drive mechanism is configured to rotate the second mould assembly around an axis of rotation extending along the first and second elongated mould assemblies. Consequently, a plurality of wellestablished mechanical systems may be used for implementing a rotational movement on the basis of the mould drive mechanism, wherein in one illustrative embodiment, the mould drive mechanism is configured to rotate the second mould assembly around a single axis of rotation that extends along the first and second elongated mould assemblies. Hence, in this embodiment, a simple and single movement is sufficient to appropriately position the first and second mould assemblies relatively with respect to each other in order to form the composite mould assembly while at the same time, due to the positioning of the entire support member at the non-interference position, the moulds drive mechanism may have any appropriate configuration, for instance in terms of the hinge system, turn leverages, and the like.

In one preferable embodiment the drive mechanism is configured to perform change of position by initiating at least a translational movement of the elongated support member. In this case, a simple and robust construction of the drive mechanism may be implemented, since a linear movement can be realised by a plurality of well-established actuators, such as hydraulic cylinders, pneumatic cylinders, motors and gearbox combinations, and the like.

In one illustrative embodiment the translational movement is a vertical movement. That is, the elongated support member may be lifted or lowered so as to appropriately position the support member in accordance with the process strategy to be applied upon forming the elongated product.

To this end, in one illustrative embodiment the drive mechanism is configured to lift the elongated support member into the non-interference position. Consequently, the non-interference position may be selected to be well above the height level of the first and second mould assemblies, thereby also ensuring superior accessibility for workers and operators, even when moving the second mould assembly into the closed position.

In another illustrative embodiment the drive mechanism is configured to lower the elongated support member into the non-interference position. In this case, the vertical movement may be implemented on the basis of robust mechanical components without requiring an installation, for instance, at the ceiling of the facility. Furthermore, in some illustrative embodiments, the support member may be lowered into the non-interference position such that workers and operators may walk above the support member, which, for instance, may be accomplished by providing an appropriate recess in the floor of the facility. In this case, the support member may be positioned at a first height level during operation of the transport system, in which also superior accessibility of the mould assemblies may be achieved, while the second height level corresponding to the noninterference position may also allow substantially complete access of the space between the mould assemblies, when the support member is in the noninterference position. It should be appreciated that the non-interference position may also be used at any appropriate stage of the overall production process, even if the first and second mould assemblies do not form the composite mould assembly.

In a further illustrative embodiment the drive mechanism is configured to perform change of position by initiating at least a rotational movement of the elongated support member along an axis of rotation that extends along the first and second mould assemblies. In this case, a movement of the support member may be initiated in a very space efficient manner by using well-established actuators, such as electric motors, and the like.

In one preferred embodiment the drive assembly is configured to bring the elongated support member into the non-interference position by the rotational movement only. In this case, an efficient rotating mechanism may be implemented in order to select an appropriate position of the support member. That is, although only a single rotational movement is sufficient to bring the support member into the non-interference position, nevertheless any intermediate angular position may also be selected, if considered appropriate for enhancing accessibility of the space between the first and second mould assemblies.

In one illustrative embodiment the drive mechanism and the mould drive mechanism are coupled and configured so as to perform the rotational movement while positioning the second elongated mould assembly relatively to the first mould assembly so as to form a composite mould assembly. The coupling of these drive mechanisms may reduce the number of required components and may also allow a very space efficient construction of the combined drive mechanism. Moreover, by mechanically coupling these drive mechanisms it may automatically be ensured that the support member is moved into the noninterference position while the second mould assembly is brought into contact with the first mould assembly. If the positioning of the support member at the non-interference position requires a different angle of rotation compared to positioning the second mould assembly above the first mould assembly, a corresponding adaptation may readily be obtained by using an appropriate gearbox. For example, if combining the first and second mould assemblies requires an angle of rotation of approximately 180°, while it is advantageous to rotate the support member by an angle of approximately 90°, a corresponding 2:1 gear ratio may be implemented. Hence, the same drive components, such as motors, hydraulic systems, and the like may be used for moving the support member and the second mould assembly, even if different angles of rotation are required.

In one illustrative embodiment the transport system comprises an outer elongated support member extending along one of the first and second elongated mould assemblies. In this manner a plurality of appropriate constructions may be implemented, for instance in order to enhanced robustness and mechanical stability, and the like since the movable part of the transport system may thus be supported by the elongated support member and at least one additional outer support member. In further illustrative embodiments, the transport system comprises a second outer elongated support member extending along the other one of the first and second elongated mould assemblies. Hence, two individually controllable movable parts may be used in the transport system, while nevertheless providing superior mechanical stability for each of the movable parts.

In a further illustrative embodiment the first and second mould assemblies comprise mould half shelves for forming a wind turbine blade. Thus, the production facility is appropriately configured to form highly complex elongated products in the form of wind turbine blades, wherein the configuration of the transport system allows a high degree of automation, while still providing for superior flexibility and accessibility of the first and second mould assemblies during the fabrication process.

According to a further aspect of the present invention the object is solved by a method for forming an elongated product, in particular a wind turbine blade, wherein elongated mould assemblies may be filled with appropriate materials on the basis of a transport system comprising a movable part that may be positioned along the length of the elongated mould assemblies by using an elongated support member. The elongated mould assemblies may be brought into a closed position by turning at least one of these elongated mould assemblies, wherein the support member is positioned in a non-interference position, thereby providing space for moving one or both of the elongated mould assemblies.

In further illustrative embodiments the positioning of the elongated support member at the non-interference position and that an appropriate work position or at any intermediate position may be accomplished by a translational movement, for instance in the vertical or horizontal direction and/or by a rotational movement around an axis of rotation that is oriented along a length direction of the elongated mould assemblies.

According to a second version of the present invention the object is solved by a production facility that comprises a first elongated mould assembly and a second elongated mould assembly extending in parallel to the first elongated mould assembly. The production facility further comprises a mould drive mechanism configured to position the second elongated mould assembly relatively to the first mould assembly so as to form a composite mould assembly. Moreover, a transport system is provided that comprises a plurality of support members extending along and laterally between the first and second elongated mould assemblies, wherein the plurality of support members forms at least one gap. The transport system of the production facility further comprises a movable part configured to be positioned at least along the first and second elongated mould assemblies by using the plurality of support members as a carrier. The production facility is characterized in that the mould drive mechanism comprises at least one interface member configured to temporarily bridge the at least one gap.

According to the second version of the present invention the mould drive mechanism is thus appropriately configured to move the elongated mould assembly into a desired combined position and adequately position the interface member in order to provide the required transport capabilities of the transport system by bridging the at least one gap. Consequently, superior accessibility of the elongated mould assemblies may be accomplished by appropriately selecting the height level of the plurality of support members while at the same time the mould drive mechanism can move the elongated mould assemblies into the position for forming the composite mould assembly without requiring any additional drive mechanism for the interface member. Furthermore, by implementing the interface member in the mould drive mechanism generally reduce complexity and construction volume for the mould drive mechanism and the transport system are achieved in the production facility.

In one illustrative embodiment the at least one interface member of the mould drive mechanism is configured to bridge the at least one gap at least in a first position of the mould drive mechanism, in which the first and second mould assemblies are separated and do not form the composite mould assembly.

In a further illustrative embodiment the at least one interface member of the mould drive mechanism is further configured to bridge the at least one gap in a second position, in which the first and second mould assemblies form the composite mould assembly.

In this embodiment the transport system is also ready to operate when the mould drive mechanism is in the second position, thereby significantly enhancing the efficiency of the transport system, since, for instance, the composite mould assembly may be accessed by a robot device, and the like.

In one illustrative embodiment the mould drive mechanism comprises at least one arm connected to the second mould assembly, wherein the interface member is a part of the at least one arm. In this case a very efficient construction is obtained, since the number of individual components of the mould drive mechanism may be reduced, while still providing for superior efficiency and flexibility of the transport system and the mould drive mechanism.

In one advantageous embodiment the one arm comprises the at least one interface member as at least one surface area that is configured to carry the movable part. In this case a surface portion of the arm of the mould drive mechanism may receive an appropriate surface configuration in order to act as a carrier surface for the movable part. The surface portion of the arm may be implemented by specifically processing a-based surface configuration of the arm and/or by incorporating a specific part piece, which provides for the desired surface characteristics. In any of these cases the interface member can be provided with reduced effort in terms of installation and fabrication requirements.

In one illustrative embodiment a first surface area and a second surface area are provided for each of the at least one gap so as to bridge each of the at least one gap in the first and second positions. As discussed above, providing the interface member in such a way that a bridging of the gap is accomplished in both the first and second position, applicability of the transport system may be extended, since the movable part may appropriately be positioned along the length of the composite mould assembly, as required.

In a further advantageous embodiment the at least one interface member is mechanically coupled to the at least one arm. In this case, the interface member may have any appropriate configuration and shape in order to meet the requirements for appropriately carrying the movable part when bridging the gap. The mechanical coupling of the interface member and the arm of the mould drive mechanism may be accomplished by a substantially rigid mechanical coupling, and the like, or by an additional mechanical transformer or gear system, when an adaptation of the movement of the arm with respect to the movement of the interface member is required.

In a further illustrative embodiment a first interface member and a second interface member are provided for each of the at least one gap so as to bridge each of the at least one gap in the first and second positions. As discussed above the transport system is thus available in the first and second positions, thereby enhancing overall efficiency of the transport system.

In a further illustrative embodiment the transport system comprises an outer elongated support member extending along one of the first and second elongated mould assemblies. In this case, the plurality of support members may act as a central support system, which may thus form in combination with the outer elongated support member a robust construction for any type of movable parts, which, for instance, may span the entire space between the outer elongated support member and the central support system.

In a further illustrative embodiment of the transport system comprises a second outer elongated support member extending along the other one of the first and second elongated mould assemblies. Consequently, a robust overall mechanical construction may be provided for both the first and second elongated mould assemblies, thereby allowing to individually process the first and second elongated mould assemblies with one or more dedicated movable parts.

In one preferred embodiment the first and second mould assemblies are configured to enable formation of a wind turbine blade. In particular when fabricating a wind turbine blade high throughput and high precision are mandatory in order to meet the typical customer demands in this industrial field.

According to another aspect of the present invention the above object is solved by the method of forming an elongated product, in particular a wind turbine blade. The method comprises filling material into a first elongated mould assembly and a second elongated mould assembly by using a movable part of a transport system that is movable along a plurality of support members of the transport system. Sween the first and second elongated mould assemblies and form at least one gap. The method further comprises turning at least one of the first and second mould assemblies by means of a mould drive mechanism so as to form a composite mould assembly. Moreover, the method comprises temporarily bridging the at least one gap by using the mould drive mechanism.

Hence, as discussed above the mould drive mechanism is specifically adapted to temporarily bridge the gap in order to provide a continuous support member for carrying the movable part of the transport system. By using the mould drive mechanism for temporarily bridging the gap generally an appropriate coordination of the movement of the mould drive mechanism for forming the composite mould assembly and the "opening" of the at least one gap is ensured, thereby reducing the overall control complexity upon opening and closing the composite mould assembly when forming an elongated product, such as a wind turbine blade.

Further illustrative embodiments are also defined in the appended claims 21-36.

According to a third version of the present invention the object is addressed by a production facility comprising a first elongated mould assembly and a second elongated mould assembly that extends in parallel to the first elongated mould assembly. The production facility further comprises a mould drive mechanism coupled at least to the second elongated mould assembly by at least one arm and configured to position the second elongated mould assembly relatively to the first mould assembly so as to form a composite mould assembly. The production facility further comprises a transport system comprising a continuous elongated support member extending along and laterally between the first and second elongated mould assemblies. The transport system further comprises a movable part configured to be positioned at least along the first and second elongated mould assemblies by using the continuous elongated support member as a carrier. The facility is characterized in that the continuous elongated support member is positioned so as to enable a rotational movement of the arm when forming the composite mould assembly.

According to this version of the present invention the rotational movement of the arm of the mould drive mechanism is implemented by an appropriate geometrical positioning and thus configuration of the continuous elongated support member without requiring any additional drive components in order to provide a continuous support member, as is for instance required in conventional production facilities. In this respect it is to be understood that the continuous elongated support member extends along a significant part of the entire length of the elongated mould assemblies, i.e. at least 50% of the entire length, while in some illustrative pictures embodiments, the continuous elongated support member extends along the entire length of the first and second elongated mould assemblies.

In one illustrative embodiment a height level of the elongated support member is less than a height level of an axis of rotation of the least one arm of the mould drive mechanism. Consequently, by selecting an appropriate height level of the elongated support member with respect to an axis of rotation a simple and robust installation of the support member is achieved, for instance by directly forming the continuous elongated support member on or slightly above the floor of the production facility.

In a further illustrative embodiment a lateral position of the at least one support member is selected so as to enable the rotational movement. In this case a certain degree of flexibility in selecting an appropriate height level of the elongated support member is preserved, thereby allowing superior accessibility of the mould assemblies by workers and operators if required.

In a further illustrative embodiment the shape of the arm is provided such that the rotational movement is not disturbed by moving the arm. In this case an appropriate height level and/or a desired lateral position of the elongated support member can be implemented by adapting the shape of the arm of the mould drive mechanism.

In one illustrative embodiment the at least one arm is shaped so as to embrace the continuous elongated support member when the composite mould assembly is formed. For this purpose the shape of the at least one arm is specifically designed such that mechanical interference with the support member in particular in the position, where the first and second mould assemblies form the composite mould assembly, is avoided. That is, the shape of the turner arm is formed so as to take into consideration the cross-sectional shape and their position of the support member in order to provide for an "embraced" configuration when the second mould assembly is positioned above the first mould assembly. For example, the at least one arm is substantially U-shaped or L-shaped.

According to another aspect of third version of the present invention the above described object is solved by a production facility having a similar configuration with respect to the first and second mould assemblies, as described above, wherein the transport mechanism, however, comprises a plurality of support members so as to form at least one gap for enabling the rotational movement of the at least one arm. Each of the plurality of support members comprises a rotatable carrier element for carrying said movable part.

According to this aspect of the present invention the plurality of support members are positioned such that the arm can be freely moved through the corresponding gaps formed by adjacent support members. Moreover, the support members comprise the rotatable carrier elements, which thus enable the translational movement of the movable part without requiring any specific construction on the side of the movable part with respect to enabling the relative motion between the support member and the movable part.

In one illustrative embodiment each two adjacent support members of the plurality of support members form a respective gap therebetween. Consequently, the plurality of support members forms a row of separated components along the elongated mould assemblies, thereby ensuring superior accessibility of the mould assemblies by workers and operators. Furthermore, the plurality of gaps formed by the row of separated support members also ensures a superior degree of flexibility in selecting a desired construction of the mould drive mechanism, for instance with respect to the size and position of corresponding drive components, and the like.

In one illustrative embodiment the movable part is configured to span at least two adjacent gaps. In this case, a reliable translational movement of the movable part is ensured, while at the same time the overall dimension of the movable part along the length direction may be selected so as to comply with the overall transport requirements without unduly increasing the overall length, since the size of the gaps can be appropriately dimensioned by selecting the number and/or the length of the individual support members.

In one illustrative embodiment an extension of each of the plurality of support members along a length direction of the elongated first and second mould assemblies is less than an extension of the gaps along the length direction. In this case the "coverage" of the entire length with the support members is reduced, thereby providing a large amount of "free space" in the form of the gaps, thereby allowing workers and operators to pass through the plurality of support members substantially irrespective of the operating position of the movable part and/or of the mould drive mechanism.

In a further illustrative embodiment of the above described aspects of the present invention the transport system comprises at least one outer support member extending along one of the first and second elongated mould assemblies. In this manner a mechanically robust construction may be implemented in the transport system, since, for instance, the movable part can be supported by the plurality of support members and the at least one outer support member in order to span the entire space between these two support members.

In a further illustrative embodiment of the aspects of the present invention the first and second mould assemblies are configured to enable formation of a wind turbine blade. Hence, the capabilities of the transport system having the simple and robust configuration with respect to the elongated support member or the plurality of support members are advantageously used in forming highly complex elongated products in the form of wind turbine blades, thereby increasing the degree of automation that can be implemented into the complex overall manufacturing process.

According to a further aspect of the present invention the object is solved by a method for forming elongated products, in particular wind turbine blades, wherein elongated mould assemblies have to be brought into contact so as to form a composite mould assembly. According to the present invention the supply of one or more materials to the elongated mould assemblies may be accomplished by using a transport system comprising a stationary support member system positioned laterally between and along the elongated mould assemblies. In the inventive method movable part is used for filling materials into the elongated mould assemblies. Furthermore, at least one of the elongated mould assemblies is turned without interference by the stationary support member system in order to form the composite mould assembly.

Hence, according to the inventive method that stationary support member system is provided such that the turning of at least one mould assembly may be performed without interference, which may be accomplished by selecting the lateral position and shape of an elongated continuous support member of the support member system and/or by selecting an appropriate shape of the turner arm of a mould drive mechanism. In other illustrative embodiments the stationary support member system this provided so as to include a plurality of support members, as is also discussed above, thereby providing for superior accessibility of the elongated mould assemblies while nevertheless avoiding interference upon forming the composite mould assembly. To this end corresponding gaps formed between the plurality of support members may be bridged by the movable part that is rotatably supported by the support members upon be moved along the elongated mould assemblies.

Further illustrative embodiments are also defined in the appended claims 37-51.

DESCRIPTION OF THE DRAWINGS

The present invention will now be described in more detail with reference to the accompanying drawings, in which.

DETAILED DESCRIPTION OF EMBODIMENTS

A first version of the present invention will now be described in more detail with reference to the accompanying drawings with FIGS. 1a to 5b, wherein generally like components are denoted by the same reference numbers except for the first digit, which generally refers to the corresponding figure, in which an embodiment is illustrated. Thus, it should be appreciated that the description of components having the same reference number except for the first digit may be omitted, if appropriate, while it is nevertheless to be understood that the component in question may have one or more of the features of corresponding components referred to in previously described or later-described embodiments.

Figure 1A:
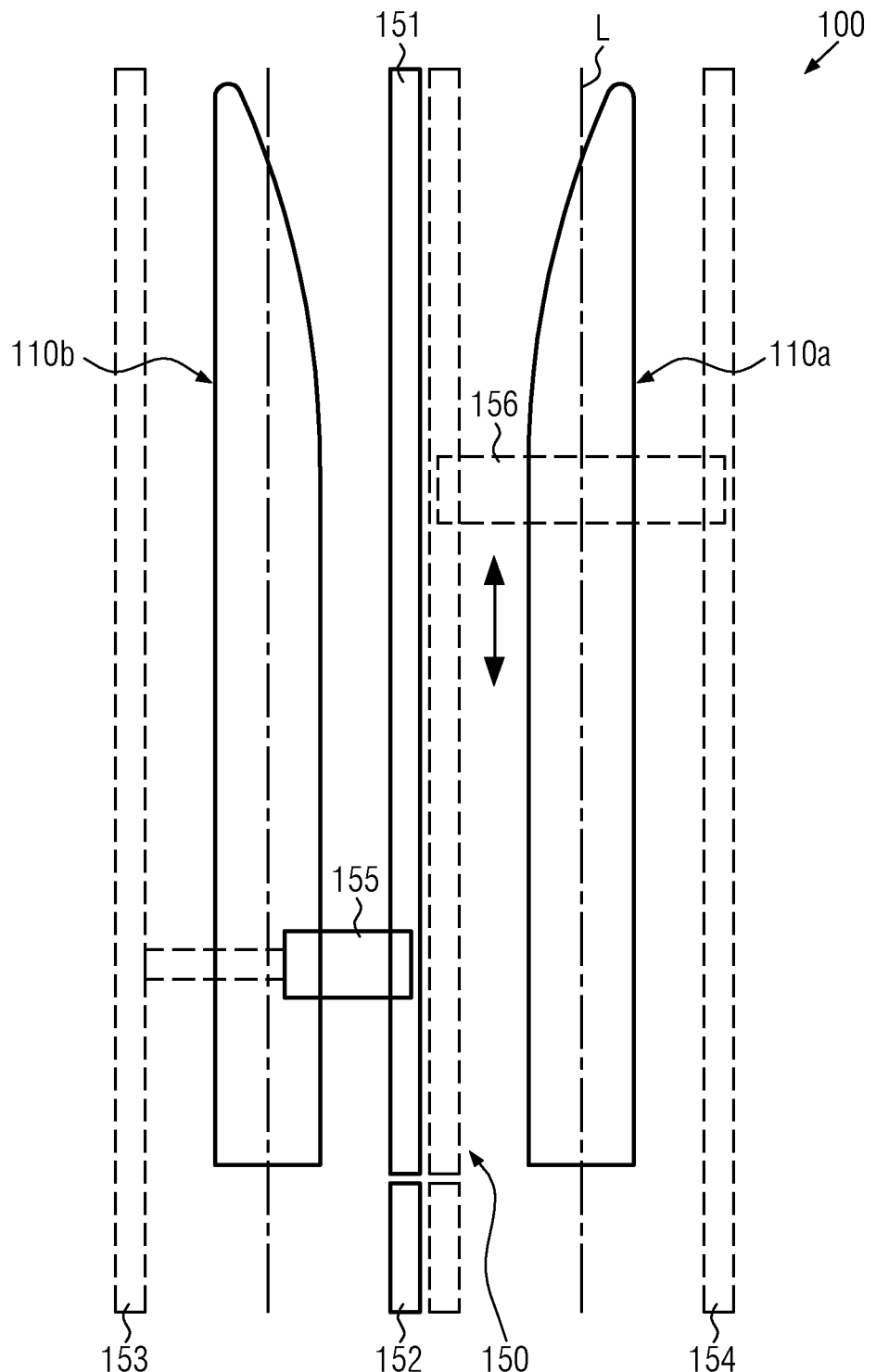
FIG. 1a schematically illustrates a top view of a production facility comprising a transport system, FIG. 1b schematically illustrates a cross-sectional view of the production facility including the transport system having a drive mechanism for changing position of a support member with respect to the first and second mould assembly according to one illustrative embodiment, FIGS. 2a and 2b schematically illustrate the production facility including a transport system that is configured to lift or lower the support member according to illustrative embodiments, FIG. 2C schematically illustrates the production facility including a transport system that is configured to move the support member horizontally according to an illustrative embodiment.

FIG. 1a schematically illustrates a top view of a production facility 100, in which are installed a first mould assembly 110a and a second mould assembly 110b, which are arranged in parallel to each other. The first and second mould assemblies 110a, 110b are elongated mould assemblies, which is to be understood such that the length, i.e. the dimension along a length direction L is significantly greater compared to the lateral perpendicular dimension. In one particular embodiment, the first and second mould assemblies 110a, 110b are configured to form corresponding halves of a wind turbine blade. The production facility 100 further comprises a transport system 150, which comprises an elongated support member 151 extending along the length direction L in parallel with the first and second mould assemblies 110a, 110b. Furthermore, the elongated support member 151, which may be provided in the form of a rail, or any other carrier that is appropriately configured to enable a movable part 155 of the transport system 150 to be moved along the support member 151, is positioned laterally between the first and second mould assemblies 110a, 110b. Furthermore, the elongated support member 151 has a length that is appropriate for allowing access of at least a significant portion of the first and second mould assemblies 110a, 110b by the movable part 155. In this respect "a significant portion" is to be understood as at least half of the entire length of the first and second mould assemblies 110a, 110b.

Furthermore, in illustrative embodiments the transport system 150 may comprise at least one outer support member 153 so that a movable part 155 may substantially completely span the space, in which the second mould assembly 110b is installed. Similarly, if required, a second outer support member 154 may be provided so as to provide for the possibility of moving a second movable part 156 above the first mould assembly 110a. In this case, the support member 151 is appropriately configured to enable independent movement of the movable parts 155, 156.

Furthermore, the transport system 150 comprises an additional support member 152, which may represent a continuation of the support member 151 in order to provide a "parking" position for the movable part 155, 156, when changing the position of the support member 151. A change of position of the support member 151 can be initialised on the basis of a drive mechanism (not shown in FIG. 1a).

Figure 1B:
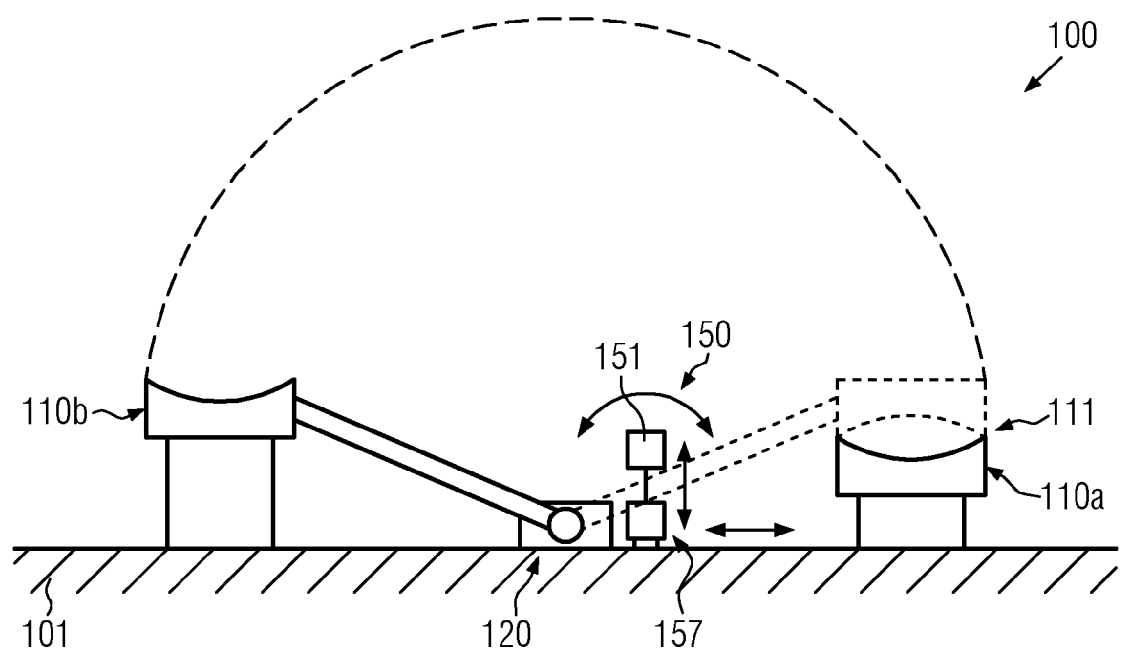

FIG. 1b schematically illustrates a cross-sectional view of the production facility 100. As illustrated, the transport system 150 comprises at least the elongated support member 151 positioned laterally between the first and second mould assemblies 110a, 110b and being mechanically coupled to a drive mechanism 157, which is appropriately configured to enable a change of position of the support member 151, for instance by causing the support member 151 to perform a translational movement and/or a rotational movement. To this end, the drive mechanism 157 comprises any appropriate components, such as electric motors, hydraulic components, pneumatic components, gear systems, and the like. Moreover, a mould drive mechanism 120 is provided and is mechanically coupled to the second mould assembly 110b. The mould drive mechanism 120 is appropriately configured to move the second mould assembly 110b into a position above the first mould assembly 110a in order to form a composite mould assembly 111. Depending on the manufacturing concept used, the first and second mould assemblies 110a, 110b may be combined into the composite mould assembly 111 once or may be separated and re-combined one or several times so as to finally form a complete elongated product, such as a wind turbine blade.

The transport system 150 is thus appropriately configured so as to allow the repositioning of the elongated support member 151 when activating the mould drive mechanism 120 in order to form of the composite mould assembly 111. That is, the support member 151 is moved from a working position, i.e. from a position, in which the movable part 155 and/or 156 (cf. FIG. 1a) can be moved along the support member 151, into a non-interference position, which thus allows the second mould assembly 110b to be moved freely to the first mould assembly 110a by the mould drive mechanism 120.

Figure 2A:
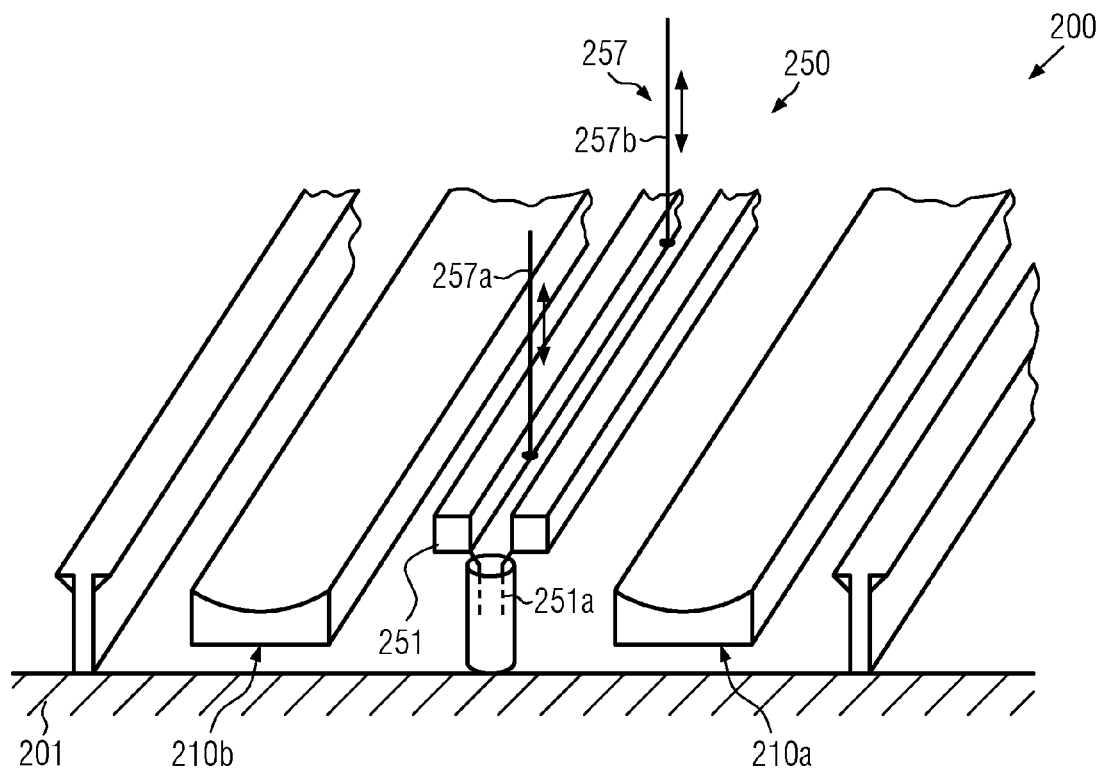

FIG. 2a schematically illustrates a perspective view of a production facility 200 including a transport system 250 that enables a repositioning of an elongated support member 251 with respect to first and second mould assemblies 210a, 210b. It should be appreciated that with respect to the components described so far also the same criteria may apply as previously explained with reference to the facility 100. As shown, the first and second mould assemblies 210a, 210b are positioned at any appropriate height level above a floor 201 and similarly the support member 251 is positioned at an appropriate height level in order to provide for superior accessibility of the first and second mould assemblies 210a, 210b. In this embodiment the transport system 250 comprises a drive mechanism 257 that is configured to lift the support member 251 to any appropriate height so as to enable a non-disturbed movement of the mould assembly 210b, as for instance explained above with reference to FIGS. 1a and 1b. For example, the drive mechanism 257 may comprise an appropriate actuator, such as a motor, and the like, which is not shown in FIG. 2a, in combination with two or more appropriately positioned mechanical connections 257a, 257b which enable a vertical movement of the member 251. As shown, the support member 251 may comprise a guide element 251a so as to precisely define the working position of the member 251.

Figure 2B:
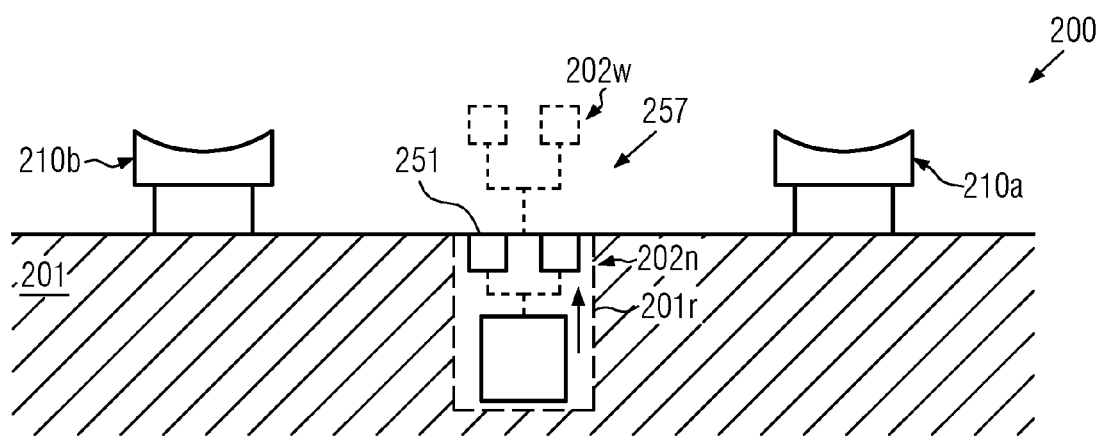

FIG. 2b schematically illustrates a cross-sectional view of the facility 200, wherein the drive mechanism 257 is appropriately configured to lower the position of the support member 251 in order to define an appropriate noninterference positioned 202n. To this end the drive mechanism 257 may be positioned in a recess 201r in the floor 201, wherein even a substantially flush configuration may be obtained in the non-interference position 202n. On the other hand, the support member 251 may be lifted into the working position 202w or in any other intermediate position.

Figure 2C:
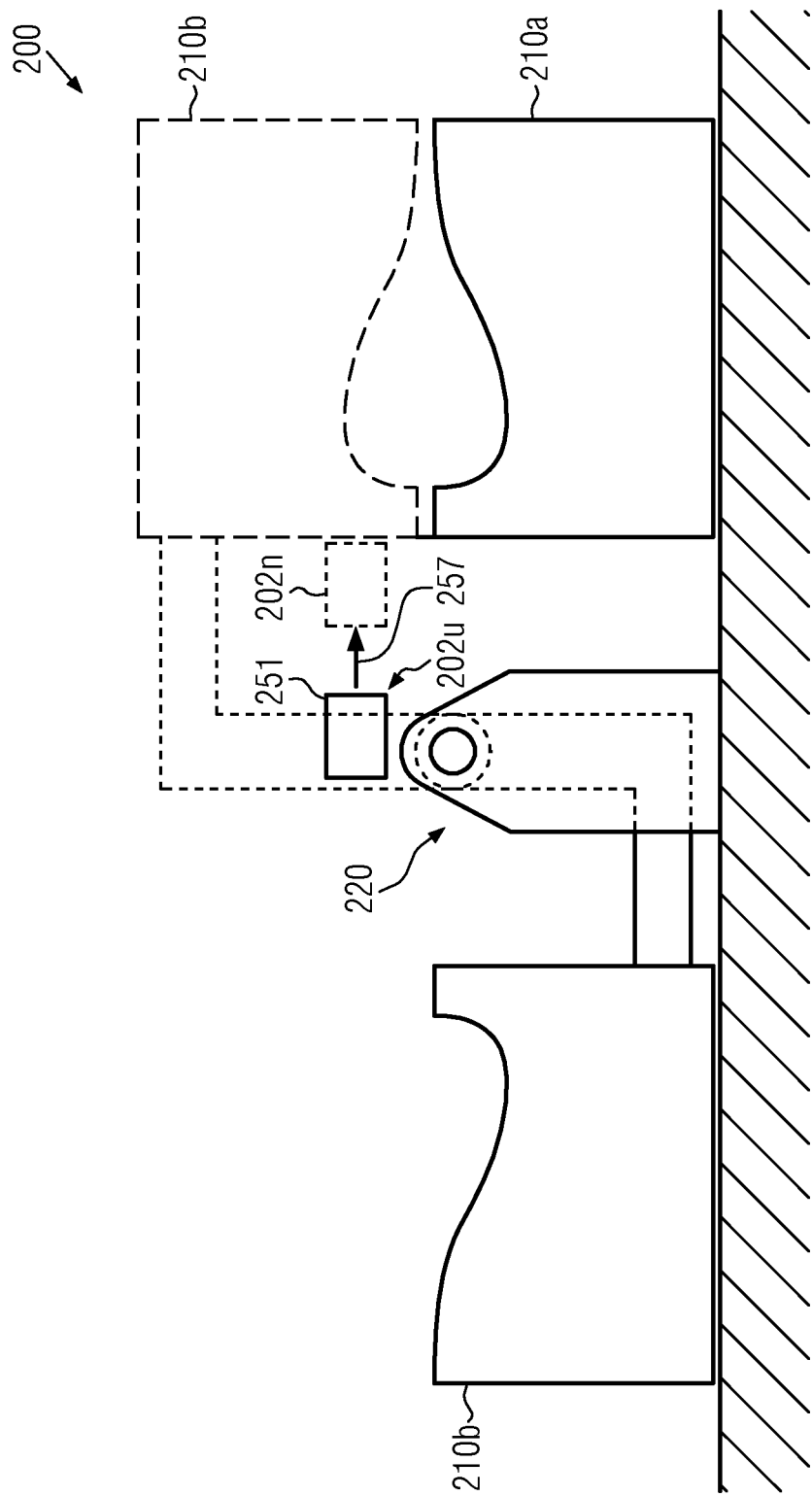

FIG. 2C schematically illustrates a cross-sectional view of the facility 200, wherein the drive mechanism 257 is configured to move the elongated support member 251 from the working position 202w into the non-interference position 202n and vice versa by initiating a translational movement in the horizontal direction. To this end, any appropriate components, such as a rail system attached to the floor or ceiling of the facility 200 may be provided with appropriately positioned and configured support members (not shown) that in turn are coupled to a drive component, such as a motor, and the like.

Figure 3A:
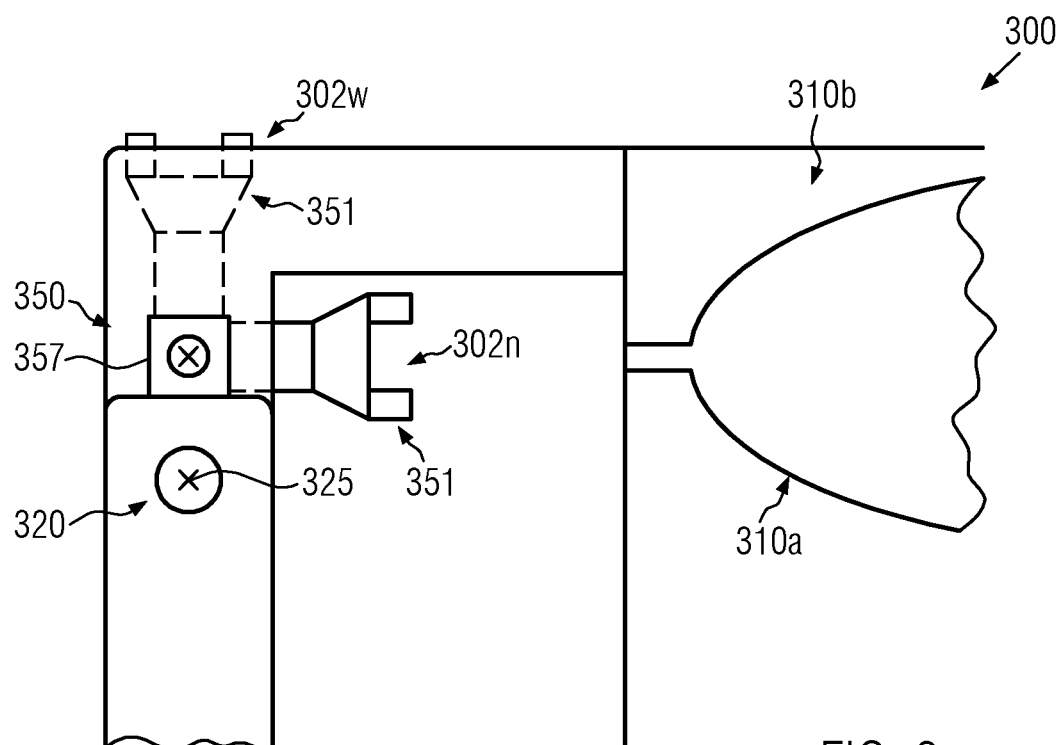
FIGS. 3a and 3b schematically illustrate the production facility with a transport system that is configured to rotate the support member according to illustrative embodiments, FIGS. 4a and 4b schematically illustrate the production facility with a transport system that is mechanically coupled to a mould drive mechanism according to illustrative embodiments, FIGS. 5a and 5b schematically illustrate the production facility with the transport system that is configured to rotate the support member independently with respect to the second mould assembly according to still further illustrative embodiments, FIG. 6a schematically illustrates a top view of a production facility comprising a transport system, FIG. 6b schematically illustrates a cross-sectional view of the production facility including a transport system and a mould drive mechanism that is appropriately configured to temporarily bridge gaps in a central support member system of the transport system according to illustrative embodiments, FIGS. 6c and 6d schematically illustrate a part of the transport system and the mode drive mechanism, wherein an interface member is implemented as a part of an arm of the mould drive mechanism according to illustrative embodiments, FIGS. 7a to 7e schematically illustrate the production facility according to further illustrative embodiments, in which a dedicated interface member is mechanically attached to an arm of the mould drive mechanism, FIG. 8a schematically illustrates a top view of a production facility comprising a transport system, FIG. 8b schematically illustrates a cross-sectional view of the production facility including the transport system, wherein a continuous elongated support member is appropriately positioned with respect to its height level such that a rotational movement of the arm of the mould drive mechanism is not hindered, FIG. 8c schematically illustrates a cross-sectional side view of the production facility, wherein the lateral position and the height level of the continuous elongated support member are selected such that a non-disturbed rotational movement of the arm is ensured so as to form the composite mould assembly according to illustrative embodiments, FIGS. 8d and 8e schematically illustrate cross-sectional side views of the production facility with a specific shape of the arm of the mould drive mechanism in order to enable a rotational movement by taking into consideration the height level and lateral position of the continuous elongated support member according to further illustrative embodiments, FIG. 9a schematically illustrates a top view of the production facility according to a further aspect of the present invention, in which a plurality of support members are positioned between the elongated mould assemblies so as to form a plurality of gaps, which may be bridged by the movable part that glides on rotating elements provided on each of the plurality of support members and FIG. 9b schematically illustrates a cross-sectional side view of the production facility including the plurality of support members.

FIG. 3a schematically illustrates a cross-sectional view of a production facility 300, in which a transport system 350 is configured so as to enable a rotational movement of a support member 351. As shown, a drive mechanism 357 is positioned in close proximity or attached to a mould drive mechanism 320 and enables a rotation of the support member 351 between the working position 302w and a non-interference position 302n. In FIG. 3a a second mould assembly 310b is positioned above a first mould assembly 310a, thereby forming the composite mould assembly, as is also discussed above. In the embodiment shown, the rotation of the second mould assembly 310b is performed around an axis of rotation 325 that extends along the length direction and thus in parallel with the elongated mould assemblies 310a, 310b. In this embodiment and also in the previously described embodiments as well as in the embodiments still to be described, the axis of rotation, such as the axis 325, represents the only axis of rotation for forming the composite mould assembly, while it is to be appreciated, however, that a more complex composite movement may be applied so as to appropriately position the first and second mould assemblies. For example, a composite movement of the first and/or the second mould assembly may comprise the patients about to laterally offset axis of rotation, possibly in combination with a translational movement. Irrespective of the complexity of the movement provided by the mould drive mechanism, such as the mechanism 320, the drive mechanism connected to the elongated support member is appropriately configured to position the support member in the non-interference position.

Figure 3B:
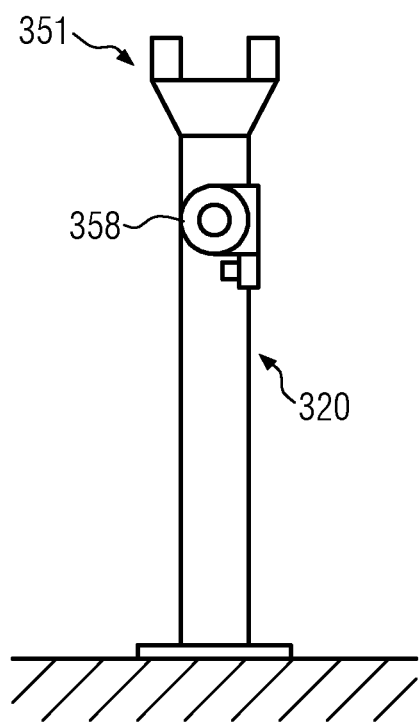

FIG. 3b schematically illustrates the support member 351 in its working position. As shown, the hinge mechanism 358 is provided, for instance attached to the mould drive mechanism 320.

Figure 4A:
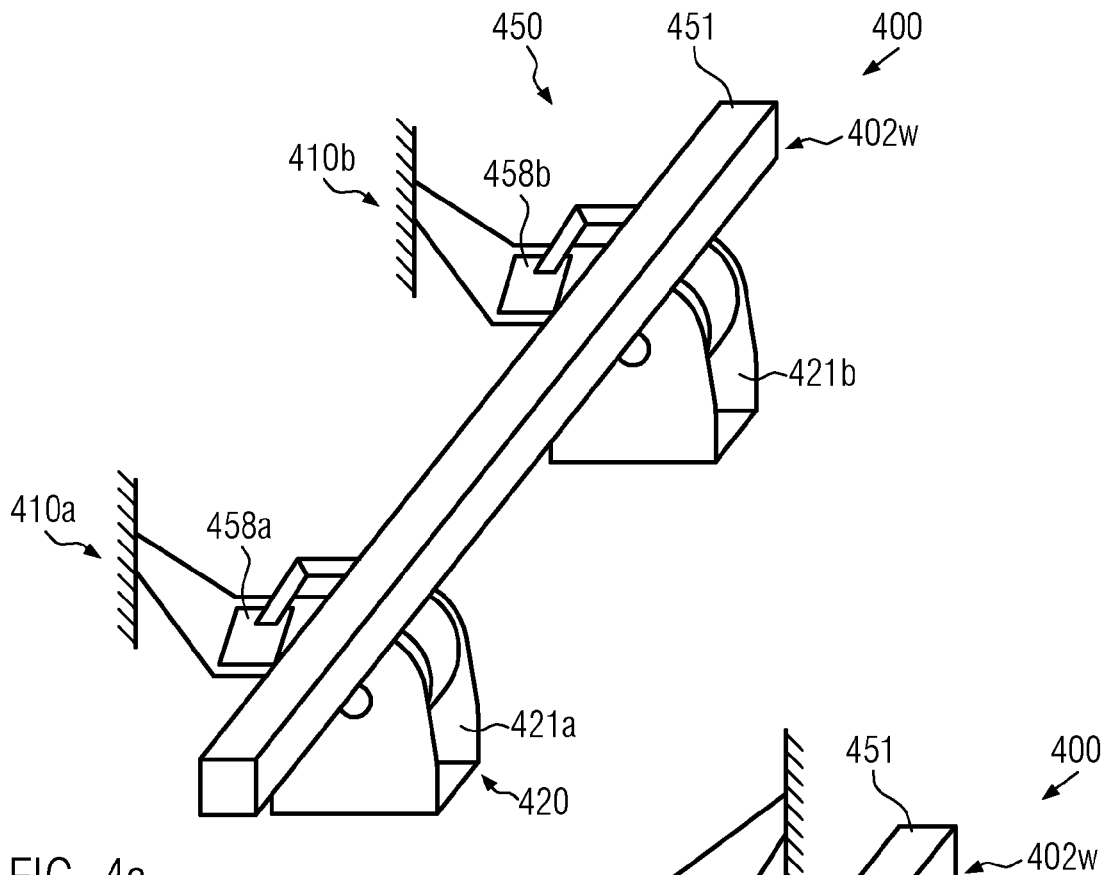

FIG. 4a schematically illustrates a perspective view of a production facility 400, in which a mould drive mechanism 420 is illustrated in the form of two individual drive components 421a, 421b, which in turn are configured to rotate a second mould assembly 410b by an appropriate angle of rotation, for instance by approximately 180° so as to position the mould assembly 410b above a first mould assembly (not shown), as discussed above. Furthermore, a transport system 450 comprises a support member 451 with drive components 458a, 458b, which are mechanically coupled to the drive components 421a, 421b, respectively. Consequently, upon activating the drive components 421a, 421b also a rotational movement of the support member 451 is initiated. Since typically the support member 451 may require a reduced angle of rotation compared to the mould assembly 410b, the drive components 458a, 458b may include a corresponding period system so as to adjust the ratio of the angles of rotation. For example, the corresponding gearboxes may result in a reduction of the angle of rotation of approximately 2:1, wherein an angle of rotation of approximately 90° is appropriate for moving the support member 451 into the non-interference position.

Figure 4B:
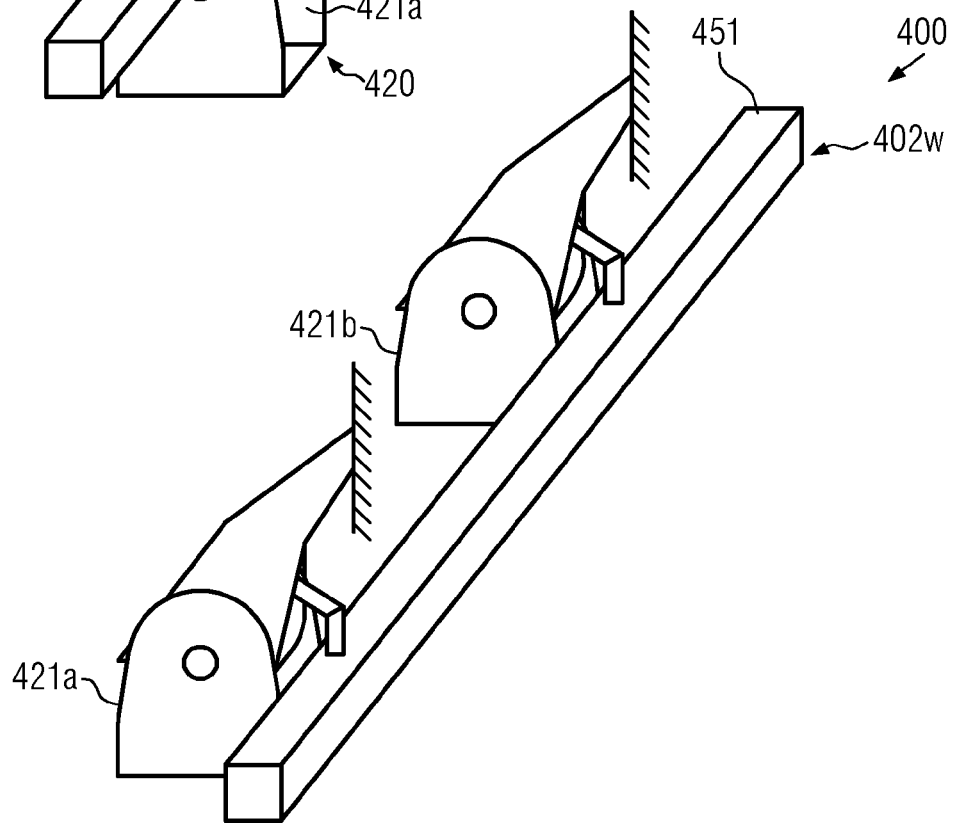

FIG. 4b schematically illustrates the support member for 51 when rotated into the working position 402n, which is accomplished by activating the drive components 421a, 421b in order to bring the mould assembly into the desired closed position.

Figure 5A:
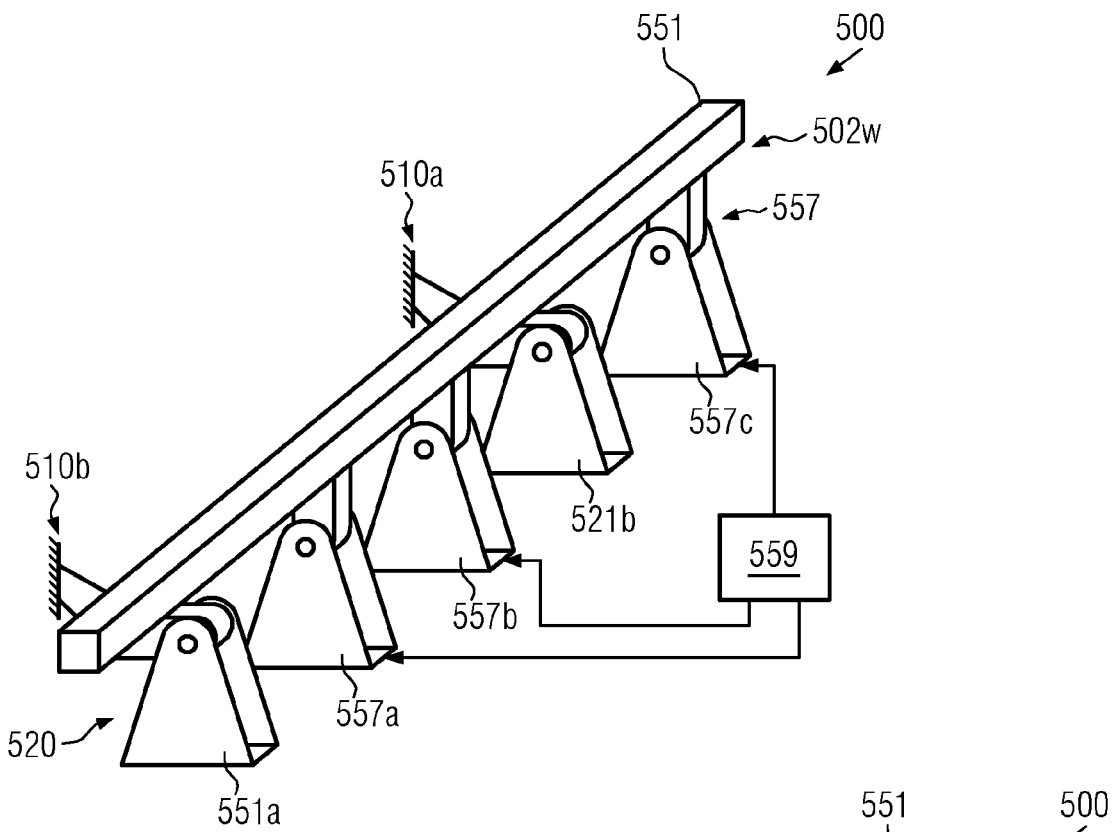

FIG. 5a schematically illustrates a perspective view of a production facility 500, in which a support member 551 is connected to a drive mechanism 557 that comprises a plurality of individual drive components 557a, 557b, 557c that are individually controllable, for instance by means of a control unit 559, with respect to a drive mechanism 520 that comprises a plurality of drive components 521a, 521b for rotating a mould assembly 510b into a closed position. Hence, contrary to the embodiments as described with reference to FIGS. 3a, 3b the support member 551 is movable independently with respect to the mould assembly 510b.

Figure 5B:
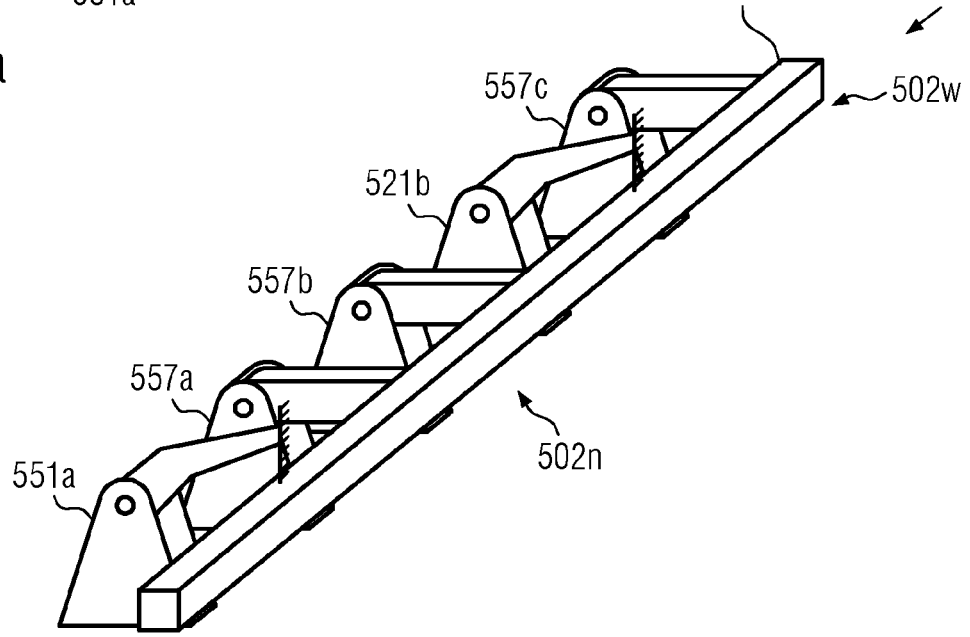

FIG. 5b schematically illustrates the production facility, when the support member 551 has been rotated into the non-interference position 502n in order to allow the subsequent activation of the mould drive assembly 520, thereby bringing the corresponding mould assemblies into the closed position.

In the above described embodiments the production facilities 100, 200, 300, 400 and 500 are appropriately configured to move the elongated support member "as a whole", thereby allowing for superior flexibility with respect to providing access to the mould assemblies by workers and operators, while, when moving the elongated support member into its working position, one or both mould assemblies may be accessed by the movable parts of the transport system, which may be used for positioning a robot device, and the like. On the other hand, the movement of the elongated support member may be appropriately controlled so as to position the support member at a non-interference position, in which a movement or rotation of the movable mould assembly is accomplished without interference by the support member. To this end, an appropriate control unit may be provided so as to coordinate the motions of the support member and the movable mould assembly. In this manner it is ensured that the one or more movable parts of the transport system are positioned in a "parking position", i.e. in the position without contact to the elongated support member, while also movement of the movable mould assembly is initiated only when the support member is positioned in its non-interference position. In one illustrative embodiment the movements of the mould assembly and the support member are mechanically coupled, thereby automatically ensuring an appropriate coordination of these two movements.

A second version of the present invention will now be described in more detail with reference to the accompanying drawings with FIGS. 6a to 7e, wherein generally like components are denoted by the same reference numbers except for the first digit, which generally refers to the corresponding figure, in which an embodiment is illustrated. Thus, it should be appreciated that the description of components having the same reference number except for the first digit may be omitted, if appropriate, while it is nevertheless to be understood that the component in question may have one or more features of corresponding components referred to in previously described or later-described embodiments.

Figure 6A:
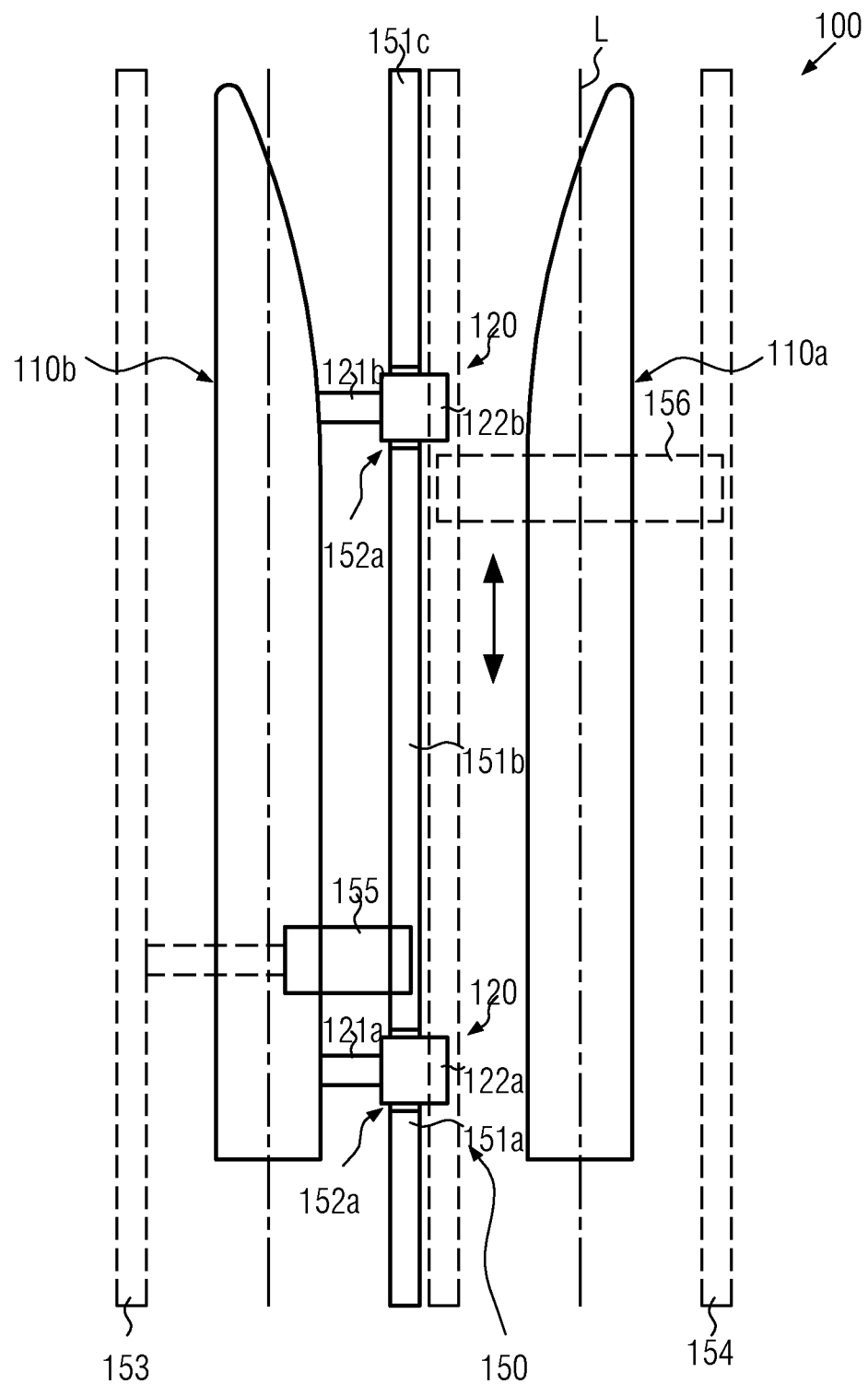

FIG. 6a schematically illustrates a top view of a production facility 100, in which are installed a first mould assembly 110a and a second mould assembly 110b, which are arranged in parallel to each other. The first and second mould assemblies 110a, 110b are elongated mould assemblies, which is to be understood such that the length, i.e. the dimension along a length direction L, is significantly greater compared to the lateral perpendicular dimension. In one particular embodiment, the first and second mould assemblies 110a, 110b are configured to form corresponding halves of a wind turbine blade. The production facility 100 further comprises a transport system 150, which comprises a plurality of support members 151a, 151b, 151c extending along the length direction L in parallel with the first and second mould assemblies 110a, 110b. Furthermore, the plurality of support members 151a, 151b, 151c, which may be provided in the form of a rail, or any other carrier that is appropriately configured to enable a movable part 155 of the transport system 150 to be moved along the support members 151a, 151b, 151c, is positioned laterally between the first and second mould assemblies 110a, 110b. Furthermore, the support members 151a, . . . , 151c have a total length that is appropriate for allowing access of at least a significant portion of the first and second mould assemblies 110a, 110b by the movable part 155. The plurality of support members 151a, 151b, 151c form at least one gap, such as a gap 152b between the support members 151b and 151c, or a gap 152a between the support member 151b and the support member 151a.

Furthermore, in illustrative embodiments the transport system 150 may comprise at least one outer support member 153 so that a movable part 155 may substantially completely span the space, in which the second mould assembly 110b is installed. Similarly, if required, a second outer support member 154 may be provided so as to provide for the possibility of moving a second movable part 156 above the first mould assembly 110a. In this case, the support members 151a, 151b, 151c is appropriately configured to enable independent movement of the movable parts 155, 156.

The facility 100 further comprises a mould drive mechanism 120, which is mechanically coupled to, for instance, the second mould assembly 110b in order to position the second mould assembly 110b above the first mould assembly 110a in a certain stage of the fabrication process. To this end, the mould drive mechanism 120 comprises one or more base support elements 122a, 122b, which may also comprise appropriate drive components, such as motors, and the like, which in turn are mechanically coupled to respective arms 121a, 121b that are connected to the mould assembly 110b. As shown, the components 122a, 122b are positioned such that the arms 121A, 1213 may be moved through the gaps 152a, 152b upon moving the second mould assembly 110b to a position above the mould assembly 110a.

Figure 6B:
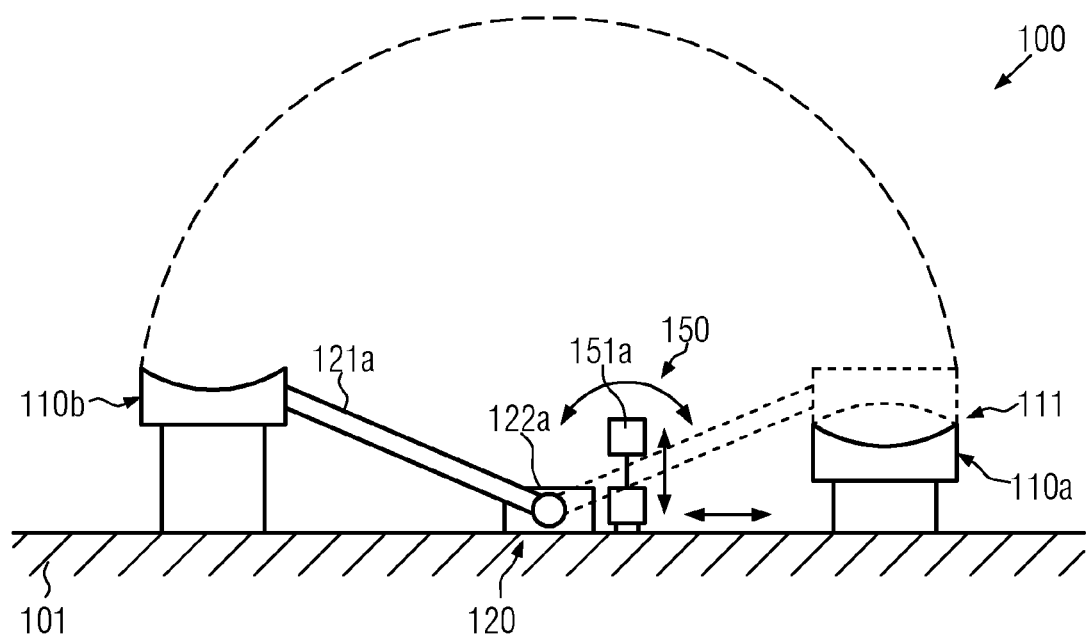

FIG. 6b schematically illustrates a cross-sectional view of the production facility 100. As illustrated, the transport system 150 comprises the support member 151a positioned laterally between the first and second mould assemblies 110a, 110b. Moreover, the mould drive mechanism 120 is mechanically coupled to the second mould assembly 110b and is appropriately configured to move the second mould assembly 110b into a position above the first mould assembly 110a in order to form a composite mould assembly 111. Depending on the manufacturing concept used, the first and second mould assemblies 110a, 110b may be combined into the composite mould assembly 111 once or may be separated and re-combined one or several times so as to finally form a complete elongated product, such as a wind turbine blade.

Figure 6C:
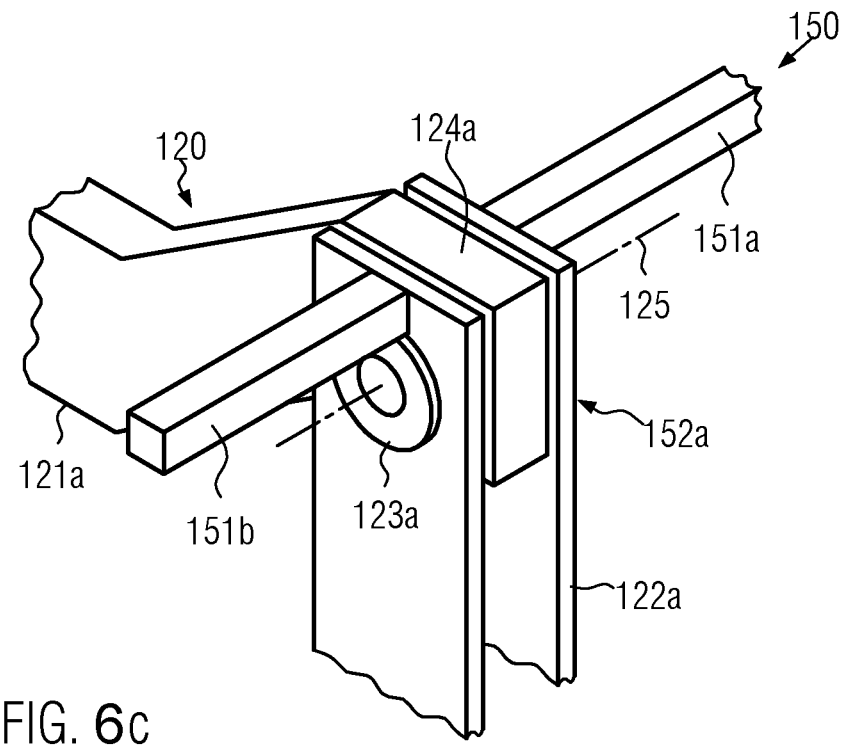

FIG. 6c schematically illustrates a perspective view of a part of the transport system 150 and the mould drive mechanism 120. As shown, the mould drive mechanism 120 comprises a hinge mechanism 123a that allows the rotation of the arm 121a around an axis of rotation 125, which extends in parallel with respect to the first and second mould assemblies (cf. FIG. 6a). Moreover, the mould drive mechanism 120 comprises an interface member 124a in order to bridge the gap 152a formed by the support members 151a and 151b, as is also explained above with reference to FIG. 6a. In the embodiment shown the interface member 124a is provided as a surface portion of the arm 121a and thus represents an integral part of the arm 121a. It should be appreciated that the surface 124a may have any appropriate configuration so as to act as a carrier for the movable part when moving along the support members 151a, 151b and crossing the gap 152a. Hence, by providing the interface member 124a as an integral part of the surface portion of the arm 121a the transport system 150 is operational in a first position, in which the mould assemblies are separated, as for instance shown in FIG. 6a.

It should be appreciated that the mould drive mechanism 120 may have a similar configuration with respect to other base support elements (cf FIG. 6a). Consequently, also other gaps in the transport system 150 may appropriately be bridged on the basis of interface members, which have a similar or the same configuration as described with reference to the interface member 124a.

Figure 6D:
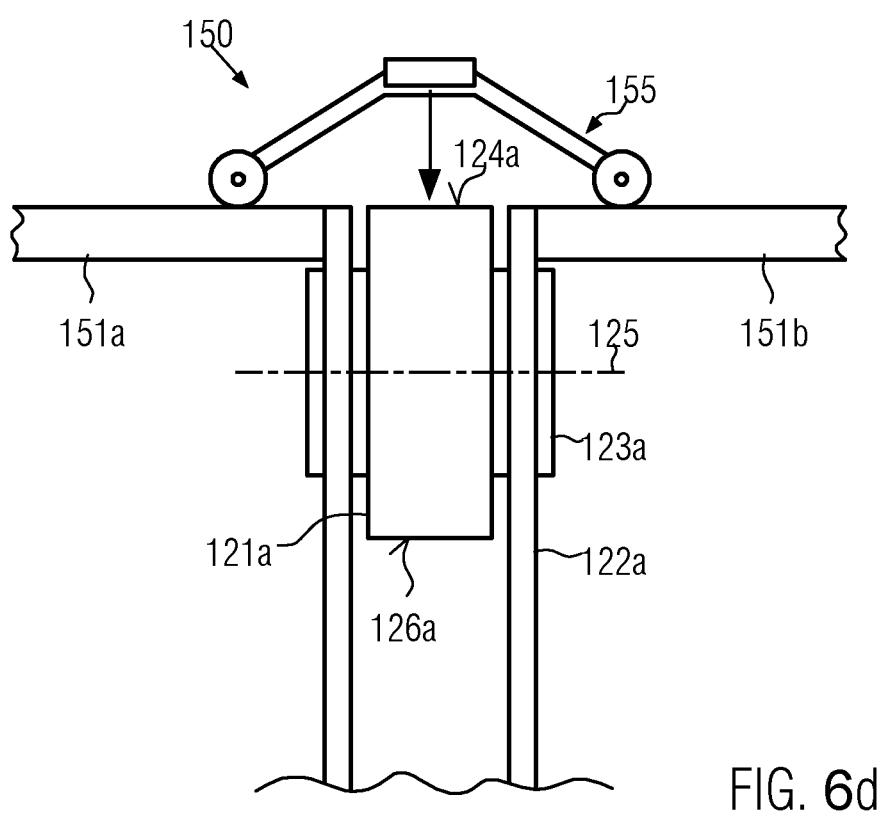

FIG. 6d schematically illustrates a side view of the transport system 150 and a part of the mould drive mechanism 120. As shown, the part 121a is in a first position, in which the movable part 155 may cross the gap 152a by using the interface member 124a as a carrier. In one illustrative embodiment the normal 121*a* may comprise a second interface member 126*a*, for instance in the form of an appropriately configured surface portion, as described above with respect to the interface member 124*a*, so that upon rotating the arm 121*a* into a second position the interface member or surface portion 126*a* is now appropriately positioned so as to bridge the gap 152*a*. In this manner, the movable part 155 may access the individual mould assemblies and also the composite mould assembly 111 as shown in FIG. 6*b*.

Figure 7A:
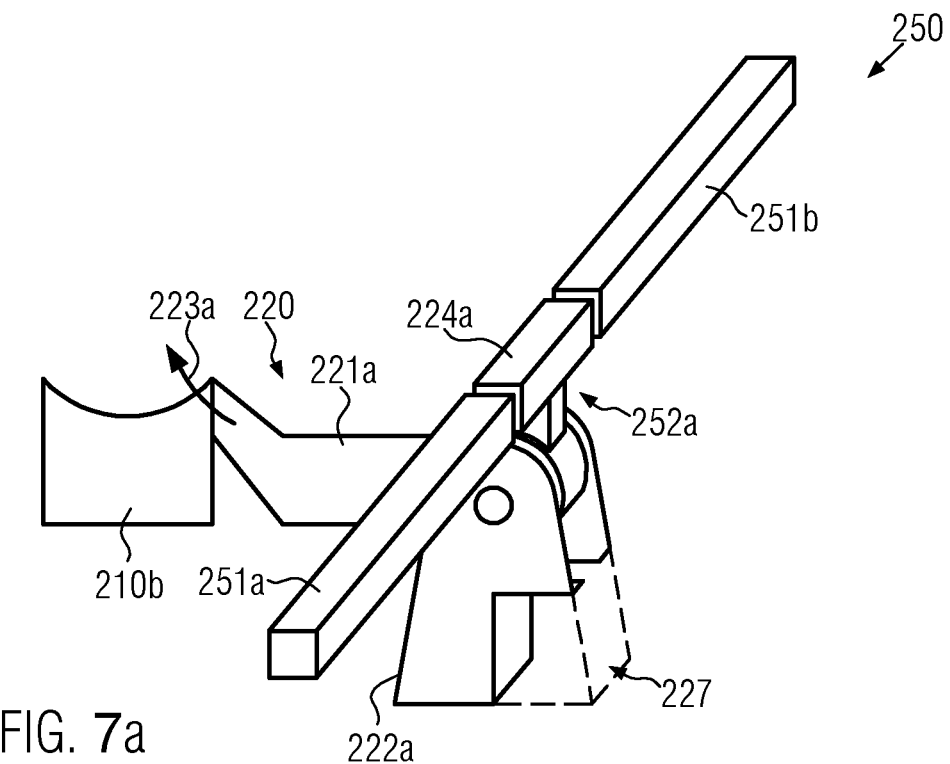

FIG. 7*a* schematically illustrates a perspective view of a transport system 250 and a mould drive mechanism 220, which may be used in the production facility 100 as described above. In the embodiment shown, the transport system 250 comprises a plurality of support members 251*a*, 251*b*, as is also discussed above, which form at least one gap 252*a*, which may be bridged temporarily by an interface member 224*a* which is mechanically coupled to the mould drive mechanism 220. In particular, the interface member 224*a* is connected to an arm 221*a*, which in turn is rotatably supported by a base support element 221*a*. In the embodiment shown, a mould assembly 210*b* is rotatably supported by the arm 221*a*, as indicated by 223*a*, such that the mould assembly 210*b* can be turned without requiring a 180° rotation of the arm 221*a*. In other embodiments, as will be discussed in more detail later on, the base support element 221*a* may comprise a recess 227 in order to accommodate the interface member 224 when rotating the arm 221*a*, when the attachment of the interface member 224*a* to the arm 221*a* is a substantially rigid mechanical connection and when the arm 221*a* needs to be rotated by approximately 180° due to a rigid mechanical connection between the arm 221*a* and the mould assembly 210*b*, as will be described with reference to FIGS. 7*c* to 7*e*. In this case, the interface member 224*a* rotates also by approximately 180° so that the interface member does not mechanically interfere with the base support member 221*a*.

In other illustrative embodiments the mechanical coupling of the interface member 224*a* to the arm 221*a* may include additional mechanical systems (not shown) so as to appropriately reduce the angle of rotation of the interface member compared to the arm 221*a*. In the illustrative embodiments of FIGS. 7*a* and 7*b*, as discussed above, the arm 221*a* is connected to the mould assembly 210*b* via the mechanical connection 223*a* in such a manner that an angle of rotation of significantly less than 180° is sufficient for rotating the mould assembly 210*b* from the first position into the second position above the other mould assembly.

Figure 7B:
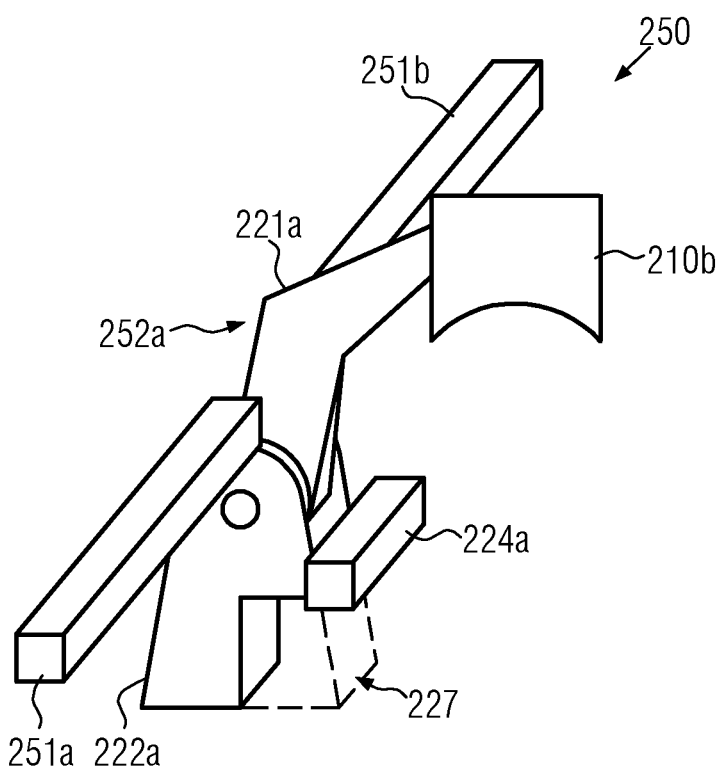

FIG. 7*b* schematically illustrates a perspective view of the transport system 250 and the mould drive mechanism 220, when the mould assembly 210*b* is in a second position in order to form the composite mould assembly, as discussed above. Consequently, the interface member 224*a* is also rotated, thereby allowing the arm 221*a* to freely move through the gap 252*a*. As discussed above, depending on the angle of rotation required for moving the mould assembly 210*b* from the first position into the second position, the interface member 224*a* is positioned within the recess 227 or any other intermediate position, as is shown in FIG. 7*b*.

Figure 7C:
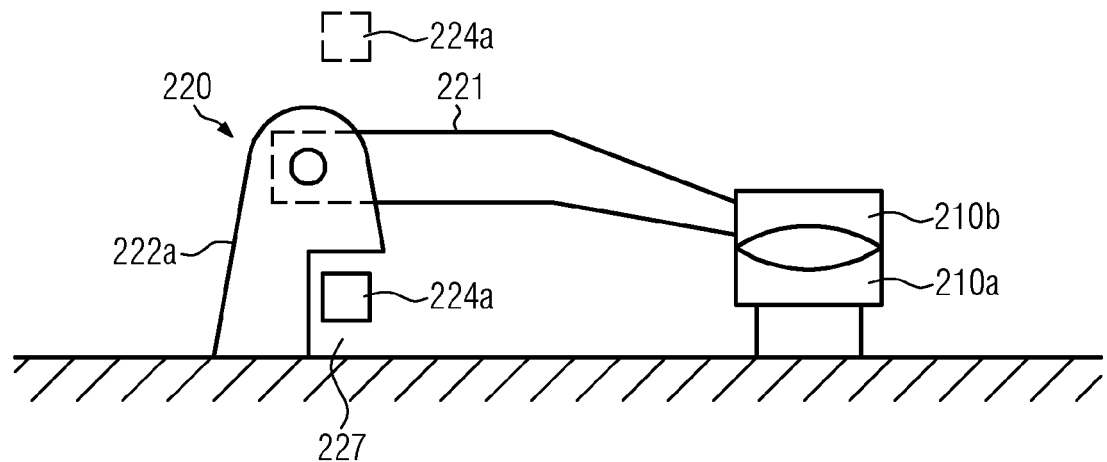

FIG. 7*c* schematically illustrates a side view according to one illustrative embodiment, in which the arm 221*a* is to be rotated by approximately 180° so that the interface member 224*a* is positioned within the recess 227, when the mould assembly 210*b* is positioned above the mould assembly 210*a*.

Figure 7D:
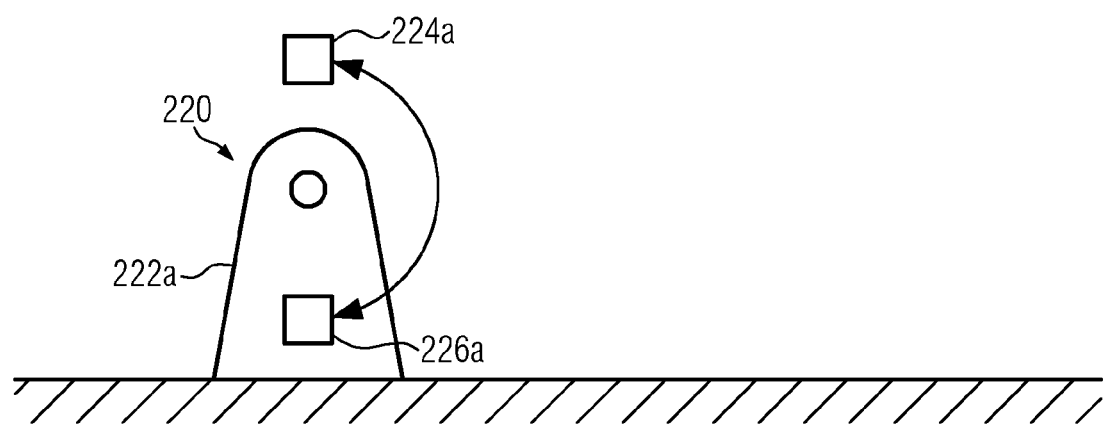

FIG. 7*d* schematically illustrates a side view of the mould drive mechanism 220, wherein a second interface member 226*a* is provided in order to bridge the gap when the mould assembly 210*b* is positioned as shown in FIG. 7*c*.

Figure 7E:
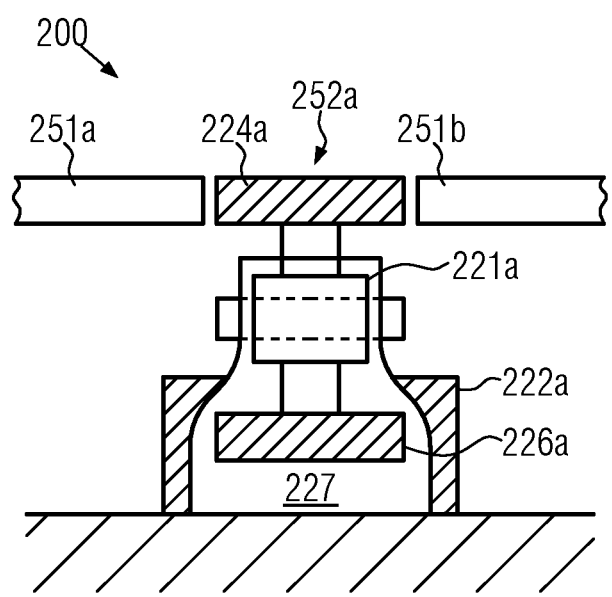

FIG. 7*e* schematically illustrates the mould drive mechanism 220 according to the embodiments as shown in FIG. 7*d*. As shown, in the first position the gap 252A is bridged by the interface member to 224*a* so that a movable part may be moved across the support members 251*a*, 251*b*. In this position the second interface member 226*a* is accommodated in the recess 227. Upon rotating the arm 221*a* into the second position (cf FIG. 7*c*) the first interface member 224*a* is moved out from the gap 252*a* and into the recess 227, while on the other hand the second interface member 226*a* is positioned in the gap 252*a*, thereby providing functionality of the transport system when the mould drive mechanism 220 is either in the first or second position.

It should be appreciated that the above description also applies to any support base elements of the mould drive mechanism 220, irrespective of the number of such members.

A third version of the present invention will now be described in more detail with reference to the accompanying drawings with FIGS. 8*a* to 9*b*, wherein generally like components are denoted by the same reference numbers except for the first digit, which generally refers to the corresponding figure, in which an embodiment is illustrated. Thus, it should be appreciated that the description of components having the same reference number except for the first digit may be omitted, if appropriate, while it is nevertheless to be understood that the component in question may have one or more features of corresponding components referred to in previously described or later-described embodiments.

Figure 8A:
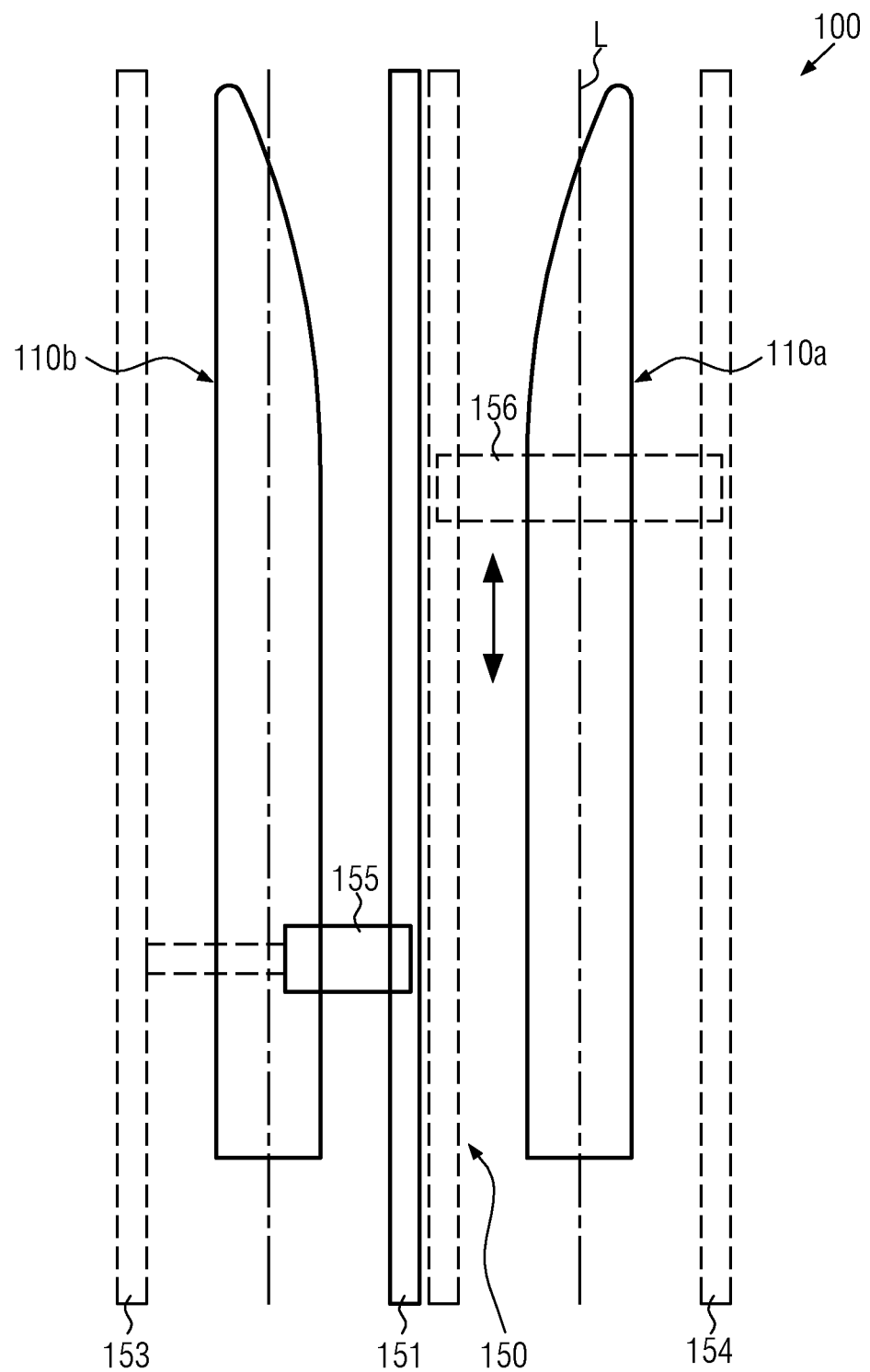

FIG. 8*a* schematically illustrates a top view of a production facility 100, in which are installed a first mould assembly 110*a* and a second mould assembly 110*b*, which are arranged in parallel to each other. The first and second mould assemblies 110*a*, 110*b* are elongated mould assemblies, which is to be understood that the length, i.e. the dimension along a length direction L is significantly greater compared to the lateral perpendicular dimension. In one particular embodiment, the first and second mould assemblies 110*a*, 110*b* are configured to form corresponding halves of a wind turbine blade, which have to be combined so as to form the complete wind turbine blade. To this end the production facility 100 comprises a mould drive mechanism (not shown in FIG. 8*a*) that is appropriately configured in order to move the second mould assembly 110*b* above and in contact with the first mould assembly 110*a*. The production facility 100 further comprises a transport system 150, which comprises a stationary support member system that is provided in the embodiment shown as an elongated support member 151 extending along the length direction L in parallel with the first and second mould assemblies 110*a*, 110*b*. Furthermore, the elongated support member 151, which may be provided in the form of a rail, or any other carrier that is appropriately configured to enable a movable part 155 of the transport system 150 to be moved along the support member 151, is positioned laterally between the first and second mould assemblies 110*a*, 110*b*. Furthermore, the elongated support member 151 has a length that is appropriate for allowing access of at least a significant portion of the first and second mould assemblies 110*a*, 110*b* by the movable part 155. In this respect "a significant portion" is to be understood as at least half of the entire length of the first and second mould assemblies 110*a*, 110*b*. In one illustrative embodiment the continuous elongated support member 151 extends at least along the entire length of the mould assemblies 110*a*, 110*b*.

Figure 8B:
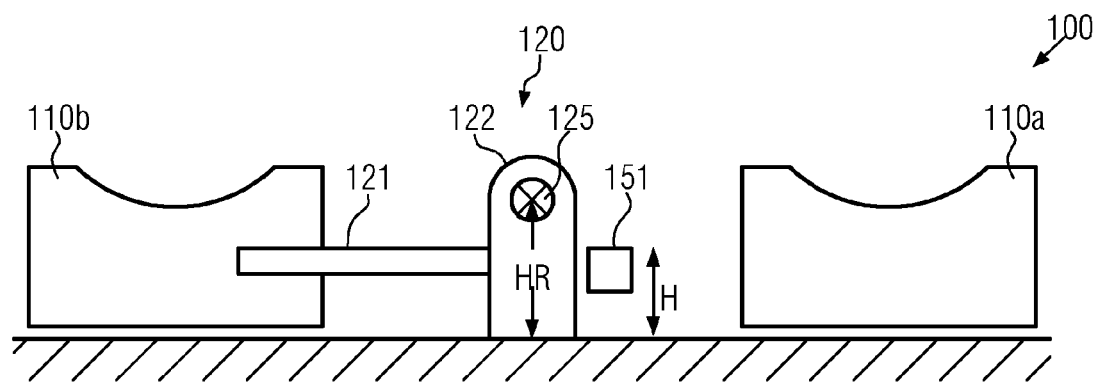

Furthermore, in illustrative embodiments the transport system 150 may comprise at least one outer support member 153 so that the movable part 155 may substantially completely span the space, in which the second mould assembly 110b is installed. Similarly, if required, a second outer support member 154 may be provided so as to provide for the possibility of moving a second movable part 156 above the first mould assembly 110a. In this case, the support member 151 is appropriately configured to enable independent movement of the movable FIG. 8b schematically illustrates a cross-sectional view of the production facility 100. As illustrated, the transport system 150 comprises at least the stationary support member system in the form of the elongated support member 151 positioned laterally between the first and second mould assemblies 110a, 110b such that non-interference of the rotational movement of the mould drive mechanism 120 is guaranteed. The mould drive mechanism 120 comprises at least one arm 121 mechanically coupled to the second mould assembly 110b, which may be rotated by any appropriate drive components, such as a motor, a hydraulic unit, a pneumatic unit, and the like which is accommodated in a corresponding drive component 122. It should be appreciated that a plurality of drive components 122 may be provided along a length of the production facility 100, i.e. along a direction perpendicular to the drawing plane of FIG. 8b.

The mould drive mechanism 120 thus defines an axis of rotation 125 along the length direction, which in the embodiment shown in FIG. 8b is positioned laterally offset with respect to the continuous support member 151 and is also positioned at a height level HR that is higher compared to a height level H of the continuous support member 151. For example, the continuous support member 151 may be installed on or slightly above the floor 101 of the production facility 100. Consequently, upon operating the mould drive mechanism 120 the rotation of the arm 121 around the axis 125 is not hindered by the support member 151, thereby enabling a positioning of the second mould assembly 110b above the first mould assembly 110a in order to form a composite mould assembly.

Figure 8C:
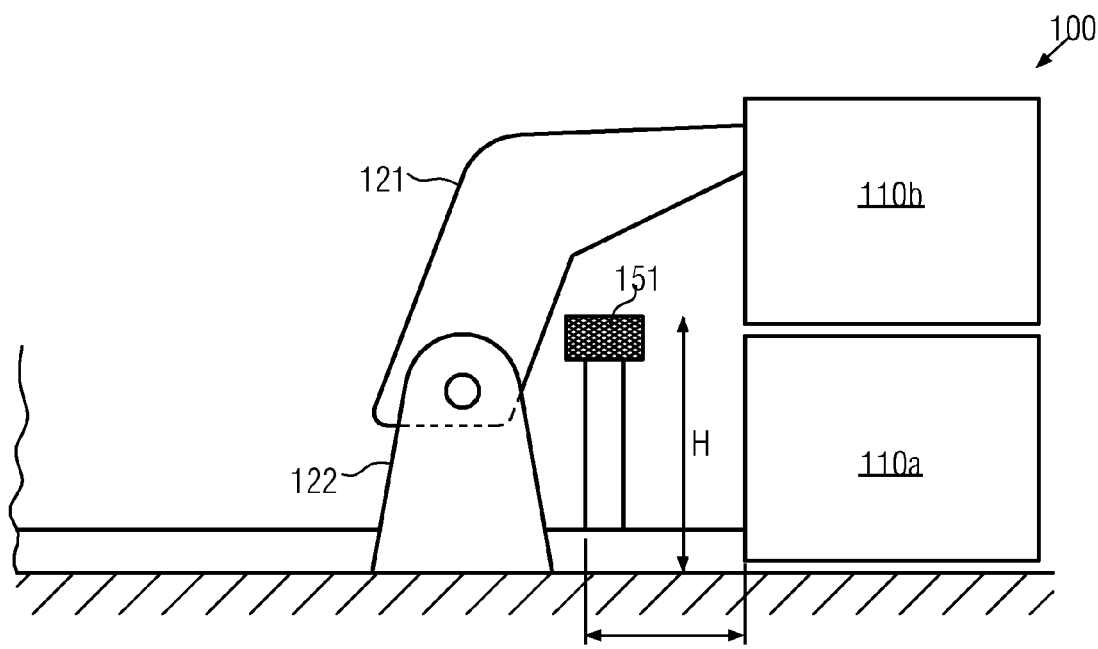

FIG. 8c schematically illustrates a cross-sectional side view of the production facility 100 according to a further illustrative embodiment, in which the continuous support member 151 is positioned at a height level H and with a lateral distance D that are appropriate for allowing a rotation of the arm 121 without being disturbed by the position of the support member 151. Hence, the second mould assembly 110b can be positioned above the assembly 110a so as to form the composite mould assembly 111. It should be appreciated that reducing the lateral distance D may allow to increase the height level H for a given construction of the arm 121 and the drive component 122 so that a desired freedom to move for operators and workers is ensured by the height level H. On the other hand, the lateral distance D nevertheless provides for a required minimum distance for a walk way to be used by workers.

Figure 8D:
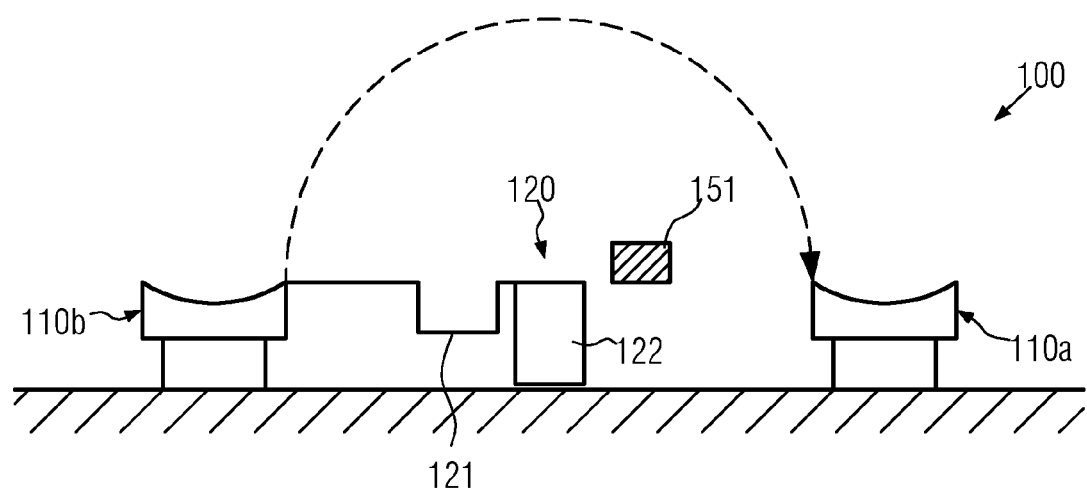

FIG. 8d schematically illustrates a cross-sectional side view of the production facility 100 according to further illustrative embodiments, in which, for a given lateral and vertical position of the continuous support member 151, an adapted shape of the arm 121 is implemented so as to allow the rotation of the arm 121 without being hindered by the support member 151. In this manner the lateral distance and the height of the support member 151 as well as its shape may be selected with superior flexibility compared to the situation as described with reference to FIG. 8c, in which the arm 121 has a substantially conventional shape. Hence, the axis of rotation, the shape and position of the member 151 may be taken into consideration upon selecting the appropriate shape of the arm 121.

Figure 8E:
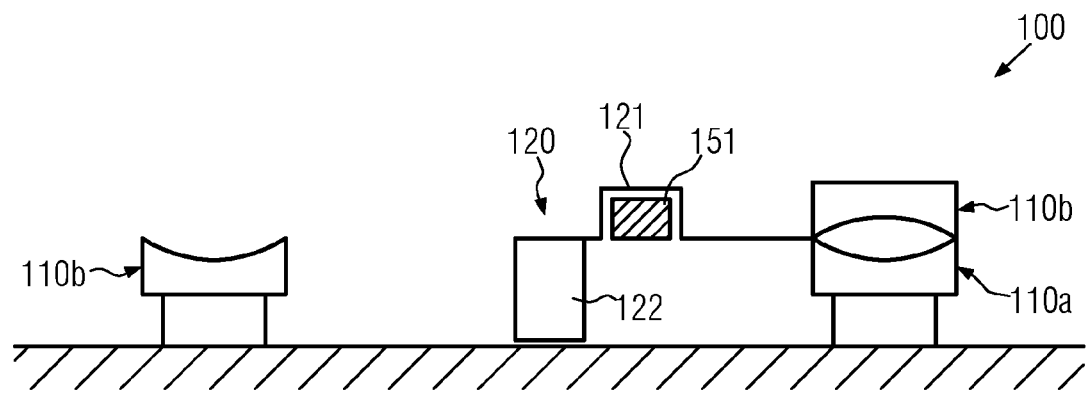

FIG. 8e schematically illustrates the mould drive mechanism 120 in a state, in which the mould assemblies 110a, 110b are in a closed position, i.e. these assemblies form the composite mould assembly 111. Hence, in this position the support member 151 is "embraced" by the arm 121, which in the embodiment shown hairs thus a substantially U-shaped configuration. In other cases, an L-shaped configuration may be applied so as to position the mould assembly 110b above the mould assembly 110a without interference caused by the support member 151.

Figure 9A:
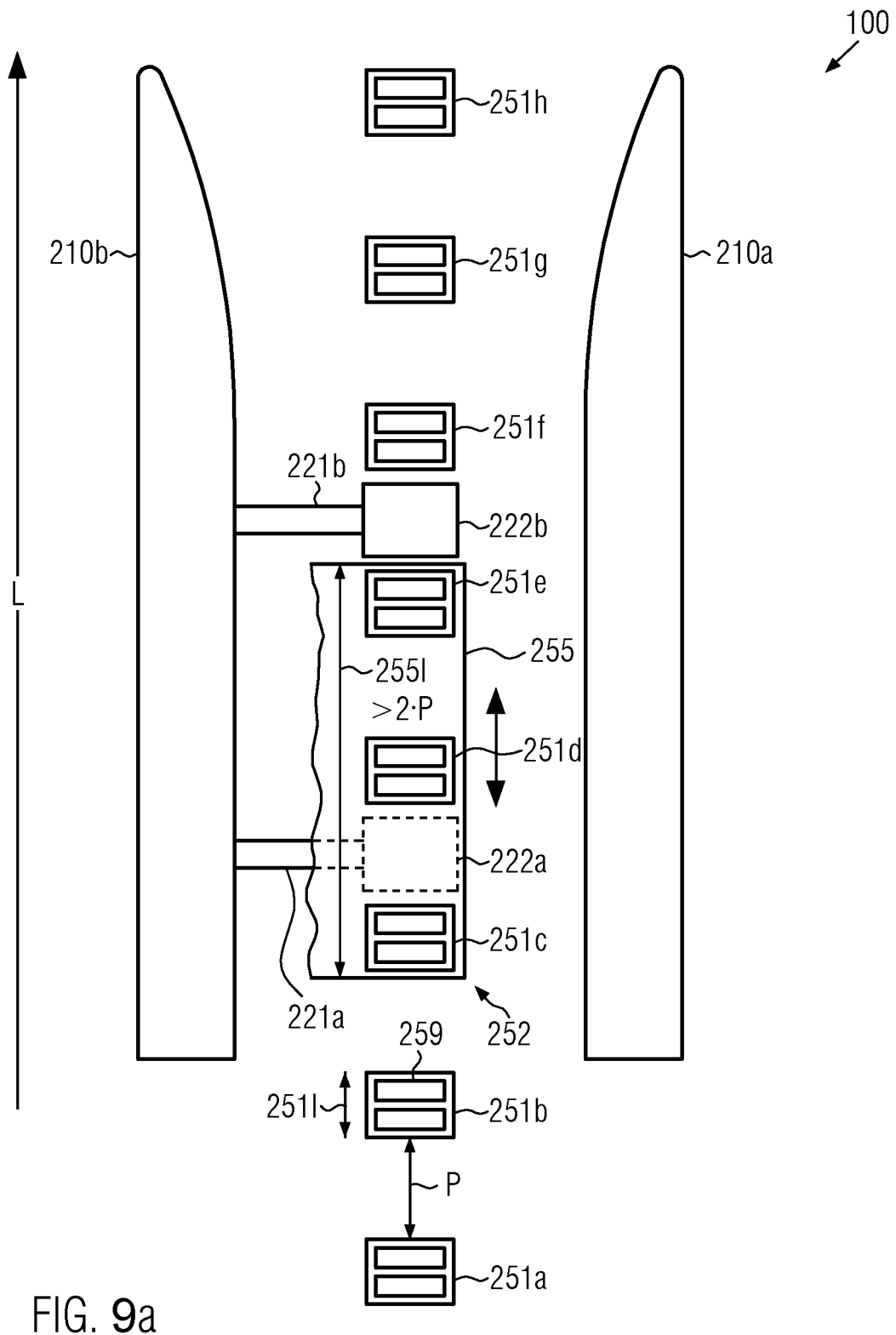

FIG. 9a schematically illustrates a top view of a production facility 200 including a transport system 250 that enables positioning of the movable part 255 along elongated mould assemblies 210a, 210b by using a stationary support member system provided in the form of a plurality of support members 251a, . . . , 251h as carriers for the movable part 255. Furthermore, as is also discussed above with respect to the facility 100 a mould drive mechanism 220 is provided, which enables a positioning of the mould assembly 210b above the mould assembly 210a by performing at least one rotational movement. To this end, the mould drive mechanism 220 comprises one or more drive components that are mechanically coupled to the mould assembly 210b. For example, a first drive component 222a is coupled to the mould assembly 210b by means of an arm 221a. Similarly, a second drive component 222b is coupled to the mould assembly 210b by means of an arm 221b.

As shown, the plurality of support member is 251a, . . . , 251h forms a plurality of gaps 252, which in turn provide superior accessibility of the entire space between the first and second mould assemblies 210a, 210b for workers and operators and also enable a rotation of the assembly 210b without interference from the support member is 251a, . . . , 251h. In the embodiment shown the gaps have a size or length, indicated by P, that is greater than a length 251l of each of the support member is 251a, . . . , 251h. Furthermore, each of the support members 251a, . . . , 251h comprises one or more rotating carrier elements 259, such as rolls, and the like. Consequently, based on the rotatable carrier elements 259 the movable part 255 may efficiently moved along the length direction L, wherein the rotatable carrier elements 259 may be driven and/or a separate drive mechanism may be implemented in the transport system 250 to drive the movable part, for instance on the basis of an additional support member, such as an outer support member as shown in FIG. 1a. Furthermore, the movable part 255 may comprise a continuous stage or base having a length 255l that is at least twice the length P of the gaps 252. In this manner, the movable part 255 is always reliably supported by the support members 251a, . . . , 251h.

Figure 9B:
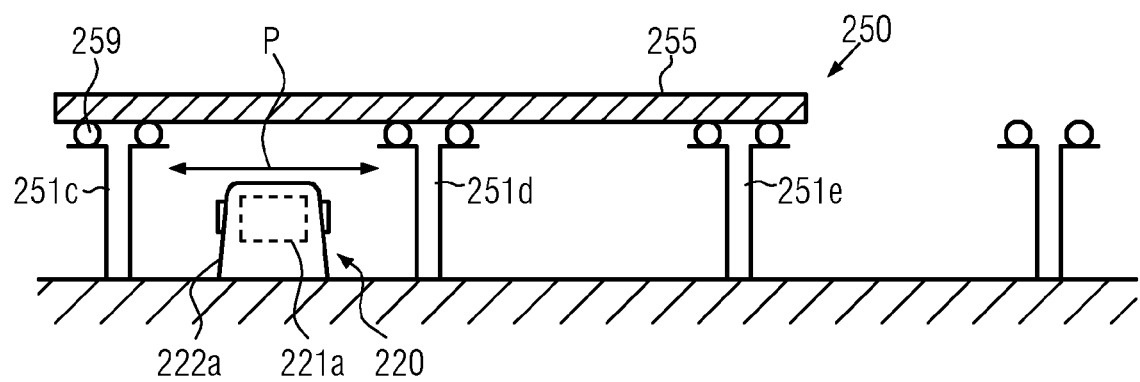

FIG. 9b schematically illustrates a cross-sectional side view of the transport system 250 and the mould drive mechanism 220. As shown, the drive component 222a is appropriately positioned at or in one of the gaps 252, which is currently bridged by the movable part 255. Hence, by appropriately positioning the movable part 255 with respect to the various drive components 222a, 222b the mould drive mechanism 220 may be activated in order to initiate a rotation. On the other hand, the plurality of gaps 252 allow workers and operators to use the space between the mould assemblies, even if the height level of the support member is 251a, . . . , 251h is relatively low. In order to coordinate the rotational movement of the mould drive mechanism 220 and of the transport system 250, i.e. of the movable part 255, appropriate control algorithms may be implemented in a corresponding control unit (not shown) in order to ensure that the movable part 255 is positioned so as to not interfere with the rotation of the mould drive mechanism 220. For example, in FIG. 9b prior to activating the mechanism 220 the movable part 255 is caused to move at least one gap further to the left hand side.

The invention claimed is:

1. A production facility comprising:
a first elongated mould assembly,
a second elongated mould assembly extending in parallel to said first elongated mould assembly, and
a transport system, wherein the transport system comprises:
    an elongated support member extending along and laterally between said first and second elongated mould assemblies, wherein the elongated support member extends along a significant portion of the first and second elongated mould assemblies,
    a movable part configured to be positioned at least along said first and second elongated mould assemblies by using said elongated support member, and
    a drive mechanism coupled to said elongated support member and configured to change a position of said elongated support member with respect to said first and second elongated mould assemblies,
    wherein said drive mechanism is configured to perform a change of position by initiating at least a translational movement of said elongated support member, and
    wherein said translational movement includes a vertical movement.

2. The production facility of claim 1; further comprising a mould drive mechanism configured to position said second elongated mould assembly relative to said first mould assembly so as to form a composite mould assembly,
    wherein said elongated support member further comprises a plurality of support members extending along and laterally between said first and second elongated mould assemblies, said elongated support member and said plurality of support members forming at least one gap,
    wherein said movable part is configured to be positioned at least along said first and second elongated mould assemblies by using said elongated support member and said plurality of support members as a carrier, and
    wherein said mould drive mechanism comprises at least one interface member configured to temporarily bridge said at least one gap, and wherein activation of the mould drive mechanism causes movement of the at least one interface member.

3. The production facility of claim 2, wherein said at least one interface member of said mould drive mechanism is configured to bridge said at least one gap at least in a first position of said mould drive mechanism, in which said first and second mould assemblies are separated and do not form said composite mould assembly.

4. The production facility of claim 3, wherein said at least one interface member of said mould drive mechanism is further configured to bridge said at least one gap in a second position, in which said first and second mould assemblies form said composite mould assembly.

5. The production facility of claim 4, wherein a first surface area and a second surface area are provided for each of said at least one gap so as to bridge each of said at least one gap in said first and second positions.

6. The production facility of claim 2, wherein said mould drive mechanism comprises at least one arm connected to said second mould assembly and wherein said interface member is a part of said at least one arm.

7. The production facility of claim 6, wherein said at least one arm comprises said at least one interface member as at least one surface area that is configured to carry said movable part.

8. The production facility of claim 2, wherein said transport system comprises an outer elongated support member extending along one of said first and second elongated mould assemblies.

9. The production facility of claim 8, wherein said transport system comprises a second outer elongated support member extending along the other one of said first and second elongated mould assemblies.

10. The production facility of claim 2, wherein said at least one interface member is mechanically coupled to said at least one arm.

11. The production facility of claim 2, wherein a first interface member and a second interface member are provided for each of said at least one gap so as to bridge each of said at least one gap in said first and second positions.

12. The production facility of claim 2, wherein said first and second mould assemblies are configured to enable formation of a wind turbine blade.

13. The production facility of claim 1, further comprising a mould drive mechanism coupled at least to said second elongated mould assembly and configured to position said second elongated mould assembly relative to said first mould assembly so as to form a composite mould assembly.

14. The production facility of claim 13, wherein said drive mechanism is configured to perform the change of position of said elongated support member so as to position said elongated support member at a non-interference position that avoids interference with the positioning of said second elongated mould assembly relative to said first mould assembly so as to form a composite mould assembly.

15. The production facility of claim 13, wherein said mould drive mechanism is configured to rotate said second mould assembly around an axis of rotation extending along said first and second elongated mould assemblies.

16. The production facility of claim 13, wherein said drive mechanism is configured to lift said elongated support member into said non-interference position.

17. The production facility of claim 1, further comprising a mould drive mechanism coupled at least to said second elongated mould assembly by at least one arm and configured to position said second elongated mould assembly relative to said first mould assembly so as to form a composite mould assembly, wherein the transport system further comprises:
    a plurality of support members positioned along and laterally between said first and second elongated mould assemblies and forming at least one gap for enabling said rotational movement of said at least one arm,
    wherein the movable part configured to be positioned at least along said first and second elongated mould assemblies by using said elongated support member and said plurality of support members as carriers, and
    wherein each of said plurality of support members comprises a rotatable carrier element for carrying said movable part.

18. The production facility of claim 17, wherein each two adjacent support members of said plurality of support members form a respective gap therebetween.

19. The production facility of claim 18, wherein said movable part is configured to span at least two adjacent gaps.

20. The production facility of claim 17, wherein an extension of each of said plurality of support members along a length direction (L) of said elongated first and second mould assemblies is less than an extension (P) of said gaps along said length direction.

21. The production facility of claim 1, wherein said transport system comprises an outer elongated support member extending along one of said first and second elongated mould assemblies.

22. The production facility of claim 21, wherein said transport system comprises a second outer elongated support member extending along the other one of said first and second elongated mould assemblies.

23. The production facility of claim 1, wherein said translational movement includes a horizontal movement.

24. The production facility of claim 1, wherein said first and second mould assemblies are configured to enable formation of a wind turbine blade.

25. A production facility comprising:
a first elongated mould assembly,
a second elongated mould assembly extending in parallel to said first elongated mould assembly,
a mould drive mechanism coupled at least to said second elongated mould assembly by at least one arm and configured to position said second elongated mould assembly relative to said first mould assembly so as to form a composite mould assembly, and
a transport system, wherein the transport system comprises:
a continuous elongated support member extending along and laterally between said first and second elongated mould assemblies, and
a movable part configured to be positioned at least along said first and second elongated mould assemblies by using said continuous elongated support member as a carrier,
wherein said continuous elongated support member is positioned so as to enable a rotational movement of said arm when forming said composite mould assembly without forming gaps in the elongated support member.

26. The production facility of claim 25, wherein a shape of said at least one arm is provided so as to enable said rotational movement.

27. The production facility of claim 26, wherein said at least one arm is shaped so as to embrace said continuous elongated support member when said composite mould assembly is formed.

28. The production facility of claim 27, wherein said at least one arm is substantially U-shaped or L-shaped.

29. The production facility of claim 25, wherein a height level (H) of said elongated support member is less than a height level (HR) of an axis of rotation of said least one arm of said mould drive mechanism.

30. The production facility of claim 25, wherein a lateral position (D) of said continuous elongated support member is selected so as to enable said rotational movement.

31. The production facility of claim 25, wherein said transport system comprises at least one outer support member extending along one of said first and second elongated mould assemblies.

32. The production facility of claim 25, wherein said first and second mould assemblies are configured to enable formation of a wind turbine blade.

33. A production facility comprising:
a first elongated mould assembly,
a second elongated mould assembly extending in parallel to said first elongated mould assembly, and
a transport system, wherein the transport system comprises:
an elongated support member extending along and laterally between said first and second elongated mould assemblies, wherein the elongated support member extends along a significant portion of the first and second elongated mould assemblies,
a movable part configured to be positioned at least along said first and second elongated mould assemblies by using said elongated support member, and
a drive mechanism coupled to said elongated support member and configured to change a position of said elongated support member with respect to said first and second elongated mould assemblies,
wherein said drive mechanism is configured to perform a change of position by initiating at least a rotational movement of said elongated support member along an axis of rotation.

34. The production facility of claim 33, wherein said drive mechanism is configured to bring said elongated support member into said noninterference position by said rotational movement only.

35. A production facility comprising:
a first elongated mould assembly,
a second elongated mould assembly extending in parallel to said first elongated mould assembly, and
a transport system, wherein the transport system comprises:
an elongated support member extending along and laterally between said first and second elongated mould assemblies, wherein the elongated support member extends along a significant portion of the first and second elongated mould assemblies,
a movable part configured to be positioned at least along said first and second elongated mould assemblies by using said elongated support member, and
a drive mechanism coupled to said elongated support member and configured to change a position of said elongated support member with respect to said first and second elongated mould assemblies,
wherein said drive mechanism is configured to lower said elongated support member into said noninterference position.

36. A production facility comprising:
a first elongated mould assembly,
a second elongated mould assembly extending in parallel to said first elongated mould assembly, and
a mould drive mechanism coupled at least to said second elongated mould assembly and configured to position said second elongated mould assembly relative to said first mould assembly so as to form a composite mould assembly,
a transport system, wherein the transport system comprises:
an elongated support member extending along and laterally between said first and second elongated mould assemblies, wherein the elongated support member extends along a significant portion of the first and second elongated mould assemblies,
a movable part configured to be positioned at least along said first and second elongated mould assemblies by using said elongated support member, and a drive mechanism coupled to said elongated support member and configured to change a position of said elongated support member with respect to said first and second elongated mould assemblies, wherein said drive mechanism and said mould drive mechanism are coupled and configured so as to perform said rotational movement while positioning said second elongated mould assembly relative to said first mould assembly so as to form a composite mould assembly.

37. A method of forming a wind turbine blade, the method comprising:

providing a first elongated mould assembly, a second elongated mould assembly, and a transport system comprising an elongated support member and a movable part that is movable along and laterally between the first and second elongated mould assemblies on the support member, wherein the elongated support member extends along a significant portion of the first and second elongated mould assemblies, filling material into the first elongated mould assembly and the second elongated mould assembly by using the movable part of the transport system, and forming a composite mould assembly by turning at least one of said first and second mould assemblies and by moving said elongated support member to a non-interference position, wherein moving said elongated support member to a non-interference position comprises performing a translational movement of said elongated support member, and wherein said translational movement includes a vertical movement.

38. The method of claim 37, further comprising:

providing the first elongated mould assembly, the second elongated mould assembly, and the transport system, wherein the transport system further comprises a plurality of support members and a movable part that is movable along the plurality of support members, said plurality of elongated support members extending along and laterally between the first and second elongated mould assemblies and forming at least one gap, turning at least one of said first and second mould assemblies by means of a mould drive mechanism so as to form a composite mould assembly, and temporarily bridging said at least one gap by using said mould drive mechanism.

39. The method of claim 38, wherein temporarily bridging said at least one gap comprises bridging said at least one gap at least in a first position of said mould drive mechanism, in which said first and second mould assemblies are separated.

40. The method of claim 39, further comprising bridging said at least one gap in a second position, in which said first and second mould assemblies form said composite mould assembly.

41. The method of claim 38, wherein temporarily bridging said at least one gap comprises positioning at least one interface member coupled to said mould drive mechanism in said at least one gap.

42. The method of claim 41, wherein positioning at least one interface member coupled to said mould drive mechanism in said at least one gap comprises positioning at least one surface area of a turner arm of said mould drive mechanism in said at least one gap.

43. The method of claim 37, wherein said translational movement includes a horizontal movement.

44. The method of claim 37, wherein providing the transport system further comprises providing a stationary support member system such that the movable part is movable along and laterally between the first and second elongated mould assemblies on the support member system, wherein the stationary support member system includes a plurality of support members forming at least one gap, and wherein the movable part is supported by rotatable carriers provided on the plurality of support members, the method further comprising turning at least one of the first and second mould assemblies without being interfered by the support member system.

45. A method of forming a wind turbine blade, the method comprising:

providing a first elongated mould assembly, a second elongated mould assembly, and a transport system comprising a stationary and continuous support member system and a movable part along and laterally between said first and second elongated mould assemblies on the support member system, filling material into the first elongated mould assembly and the second elongated mould assembly by the transport system, and turning at least one of said first and second mould assemblies without being interfered by said support member system and without forming gaps in the support member system.

46. The method of claim 45, further comprising shaping an arm of a mould drive mechanism such that the support member system does not interfere with the arm as the at least one of said first and second mould assemblies is turned.

47. A method of forming a wind turbine blade, the method comprising:

providing a first elongated mould assembly, a second elongated mould assembly, and a transport system comprising an elongated support member and a movable part that is movable along and laterally between the first and second elongated mould assemblies on the support member, wherein the elongated support member extends along a significant portion of the first and second elongated mould assemblies, filling material into the first elongated mould assembly and the second elongated mould assembly by using the movable part of the transport system, and forming a composite mould assembly by turning at least one of said first and second mould assemblies and by moving said elongated support member to a non-interference position, wherein moving said elongated support member to a non-interference position comprises performing a rotational movement of said elongated support member around an axis of rotation that is oriented along a length direction of said first and second elongated mould assemblies.

* * * * *

UNITED STATES PATENT AND TRADEMARK OFFICE
CERTIFICATE OF CORRECTION

| | |
|---|---|
| PATENT NO. | : 9,689,266 B2 |
| APPLICATION NO. | : 14/235390 |
| DATED | : June 27, 2017 |
| INVENTOR(S) | : Anton Bech et al. |

It is certified that error appears in the above-identified patent and that said Letters Patent is hereby corrected as shown below:

In the Specification

Column 3
Line 28, change "wellestablished" to --well-established--.

Column 5
Line 27, change "that" to --at--.

Column 6
Line 9, change "reduce" to --reduced--.
Line 44, change "a-based" to --a--.

Column 7
Line 19, change "In a" to --A--.
Line 40, delete "Sween" and insert --The plurality of support members extend along and laterally between--.

Column 8
Line 29, after the first occurrence of "the" insert --at--.
Line 63, delete "third version of".

Column 10
Line 19, change "this" to --is--.
Line 26, change "be" to --being--.

Column 12
Line 63, delete "of".

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*

Column 14
Line 6, change "patients about to" to --rotation about a--.
Line 39, delete "for".

Column 16
Line 5, delete "are".

Column 18
Line 6, delete "to".

Column 19
Line 10, after "movable" insert --part 155.--.

Column 20
Line 10, change "hairs" to --has--.
Line 32, change "member" to --members-- and delete "is".
Line 37, change "member" to --members-- and delete "is".
Line 40, change "member" to --members-- and delete "is".
Line 44, after "efficiently" insert --be--.
Line 65, change "member" to --members--.
Line 66, delete the first occurrence of "is".

In the Claims

Column 21
Claim 2, Line 34, change "1;" to --1--.

Column 22
Claim 17, Line 57, after "part" insert --is--.

Column 23
Claim 29, Line 56, after "said" insert --at--.